United States Patent
Xu et al.

(10) Patent No.: US 12,438,641 B2
(45) Date of Patent: Oct. 7, 2025

(54) END-TO-END HYBRID AUTOMATIC REPEAT REQUEST (HARQ) FOR RELAY COMMUNICATIONS WITH USER EQUIPMENT (UE) COOPERATION

(71) Applicants: Hua Xu, Ottawa (CA); Jianglei Ma, Ottawa (CA)

(72) Inventors: Hua Xu, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 937 days.

(21) Appl. No.: 17/565,549

(22) Filed: Dec. 30, 2021

(65) Prior Publication Data

US 2022/0224445 A1 Jul. 14, 2022

Related U.S. Application Data

(60) Provisional application No. 63/135,138, filed on Jan. 8, 2021.

(51) Int. Cl.
*H04L 1/1812* (2023.01)
*H04B 7/155* (2006.01)
*H04L 1/1607* (2023.01)
*H04L 1/1867* (2023.01)

(52) U.S. Cl.
CPC .......... *H04L 1/1812* (2013.01); *H04B 7/155* (2013.01); *H04L 1/1671* (2013.01); *H04L 1/1874* (2013.01)

(58) Field of Classification Search
CPC ... H04L 1/1812; H04L 1/1816; H04L 1/1819; H04L 1/1671; H04L 1/1874; H04L 1/1867; H04B 7/155; H04B 7/204; H04B 7/18517

See application file for complete search history.

(56) References Cited

U.S. PATENT DOCUMENTS

| | | |
|---|---|---|
| 2010/0153806 A1 | 6/2010 | Yu et al. |
| 2014/0241254 A1 | 8/2014 | Kaur et al. |
| 2017/0265187 A1 | 9/2017 | Chen et al. |
| 2020/0351680 A1 | 11/2020 | Cho et al. |
| 2020/0382207 A1* | 12/2020 | Medles ................. H04L 1/1822 |
| 2020/0404663 A1 | 12/2020 | Zhang et al. |
| 2022/0078755 A1 | 3/2022 | Xu et al. |
| 2023/0180098 A1* | 6/2023 | Harounabadi ........ H04W 40/24 370/315 |

FOREIGN PATENT DOCUMENTS

CN 109845378 A 6/2019

OTHER PUBLICATIONS

"Considerations on Two-Hop HARQ for Relay", CMCC, 3GPP TSG-RAN WG1 #60bis, R1-102158, Beijing, China, Apr. 12-16, 2010, 2 pages.

* cited by examiner

*Primary Examiner* — Brian T Le

(57) ABSTRACT

An end-to-end HARQ process is associated with a data transmission from a first end node to a second end node along a UE relay path. The UE relay path includes multiple links between nodes along the entire UE relay path between the first end node and the second end node. The end-to-end HARQ process is a single HARQ process that is denoted by a single HARQ process identifier.

23 Claims, 18 Drawing Sheets

END-TO-END HYBRID AUTOMATIC REPEAT REQUEST (HARQ) FOR RELAY COMMUNICATIONS WITH USER EQUIPMENT (UE) COOPERATION

CROSS-REFERENCE TO RELATED APPLICATION

This application is related to and claims the benefit of U.S. Provisional Patent Application No. 63/135,138, filed on Jan. 8, 2021, the entire contents of which are incorporated herein by reference.

FIELD

This application relates generally to communications in a wireless communication network, and in particular to end-to-end hybrid automatic repeat request (HARQ) for relay communications that involve user equipment (UE) cooperation.

BACKGROUND

According to so-called "relay" techniques in Long Term Evolution (LTE) and New Radio (NR), UEs communicate directly with each other for facilitating downlink and uplink transmissions. A primary goal for relay techniques in LTE is for use in public safety applications, and new requirements are emerging in NR, for commercial applications and enhancements on public safety. Development of relay techniques can increase demand on performance of relay systems, in respect of such performance measures as system throughput, coverage, latency, and reliability. New applications and requirements for multi-hop relay in NR may be geared toward providing not only coverage extension but also system throughput enhancement, for video monitoring and feedback in police and firefighter applications for example.

UE cooperation (UC) involves cooperative procedures among UEs in a group of UEs, and may be achieved by a group of UEs helping each other with either or both of downlink and uplink communications to improve UE peak data rate and system throughput, especially at coverage area edges. One option for UC is to use UE relay, which involves a UE forwarding data for another UE. Cooperating UEs coordinate with each other, to assist a target UE to which data is targeted or destined, for example.

In a conventional UE relay approach, a conventional HARQ process is applied between two consecutive UEs (relay UEs) or between a relay UE and an end node. In a multi-hop system, this can be referred to as a hop-by-hop HARQ process. A next hop transmission will start only after a previous hop transmission (or re-transmission) succeeds using a hop-by-hop HARQ process. After each hop-by-hop transmission succeeds, its corresponding hop-by-hop HARQ process will be terminated. Different hop transmissions and HARQ processes are separated, which may be not beneficial for UC and re-transmission across non-consecutive nodes, such as non-consecutive relay UEs or a relay UE and an end node that are not consecutive along a relay path, or a node that has multiple links from previous nodes and could receive the same data from the multiple links. This could cause more latency, especially in a multi-hop relay system.

SUMMARY

An end-to-end HARQ process is proposed herein to provide end-to-end HARQ for data communication between a pair of end nodes, to improve overall system performance such as robustness and latency. Such an end-to-end HARQ process may be used for communication of data over multiple links of a UE relay path that involves UE cooperation, for example, and may potentially involve multi-path communications and each path may contain single link (direct path) or multi-links.

In some embodiments, a HARQ process for end-to-end relay and UC may be configured for end-to-end multi-path/multi-hop relay and UC between a pair of nodes, including a source node and a destination node. A HARQ entity may exist only at the source node and the destination node, where relay traffic starts and ends, in some embodiments. The same HARQ process, with the same HARQ identifier (ID) for example, could be applied to each link, segment, or hop transmission between the source node and the destination node to carry the same data. If multiple paths are configured between the source and destination nodes, then the same HARQ process could be applied to each path, including each link or segment of each path, to carry the same data between the source and destination nodes.

A HARQ buffer for the same HARQ process could be reserved or otherwise configured on each node in a multi-link path, including one or more relay UEs and the source and destination nodes. A HARQ buffer at a node may be a shared HARQ buffer that is shared between one or more end-to-end HARQ processes and one or more hop-by-hop HARQ processes in some embodiments.

A node, such as a relay UE and/or a destination node, could apply soft or hard combining of data that is received over different links after identifying the received data as the same data or related data transmitted using the same end-to-end HARQ process.

Re-transmissions toward a destination node using an end-to-end HARQ process may potentially be sent from the source node or a relay UE on the same path or a different path between the source node and the destination node.

Potential applications of HARQ processes as disclosed herein could include scenarios with virtual UEs, with different traffic types that have relatively more stringent or less stringent requirements on latency, and with more periodic traffic such as IoT scenarios.

One aspect of the present disclosure relates to a method that involves communicating, in a wireless communication network, signaling for configuring an end-to-end HARQ process. The end-to-end HARQ process is associated with a first data transmission from a first end node to a second end node along a UE relay path that includes multiple links between nodes along the relay path between the first end node and the second end node. The end-to-end HARQ process is a single HARQ process that is denoted by a single HARQ process identifier.

An apparatus according to another aspect of the present disclosure includes: a communication interface; a processor, coupled to the communication interface; and a non-transitory computer readable storage medium, coupled to the processor. The non-transitory computer readable storage medium stores programming for execution by the processor. The programming includes instructions to: communicate, in a wireless communication network, signaling for configuring an end-to-end HARQ process associated with a first data transmission from a first end node to a second end node along a UE relay path. The UE relay path includes multiple links between nodes along the relay path between the first end node and the second end node, and the end-to-end HARQ process is a single HARQ process that is denoted by a single HARQ process identifier.

Another embodiment that includes such a medium relates to a computer program product including a non-transitory computer readable storage medium storing programming. The programming includes instructions to: communicate, in a wireless communication network, signaling for configuring an end-to-end HARQ process. As in other embodiments described above and elsewhere herein, the end-to-end HARQ process is associated with a first data transmission from a first end node to a second end node along a UE relay path, the UE relay path includes multiple links between nodes along the relay path between the first end node and the second end node, and the end-to-end HARQ process is a single HARQ process that is denoted by a single HARQ process identifier.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Figure 1:
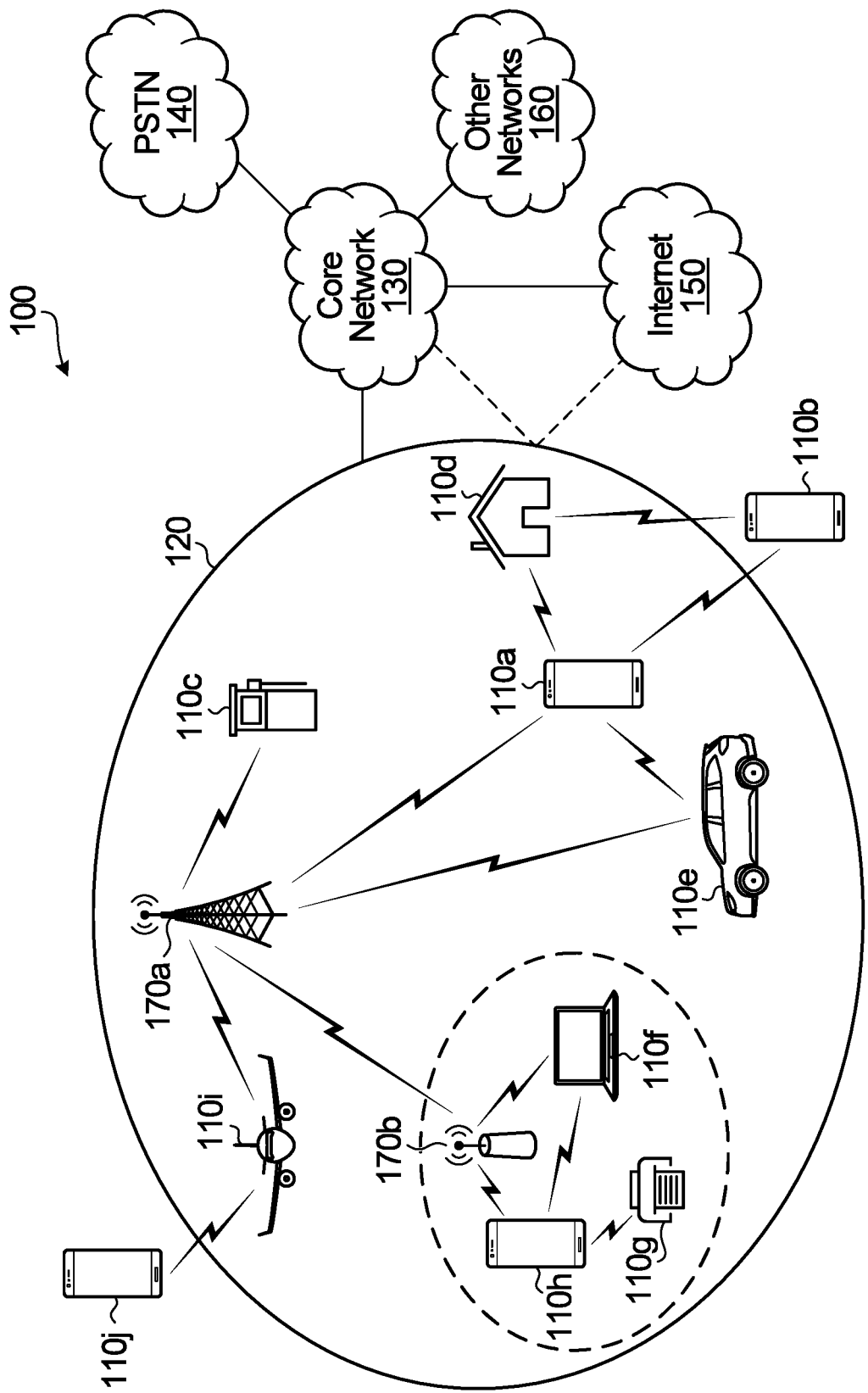
FIG. 1 is a block diagram that provides a simplified schematic illustration of a communication system.

Referring to FIG. 1, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-110j (generically referred to as 110) may be interconnected to one another, and may also or instead be connected to one or more network nodes (170a, 170b, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2:
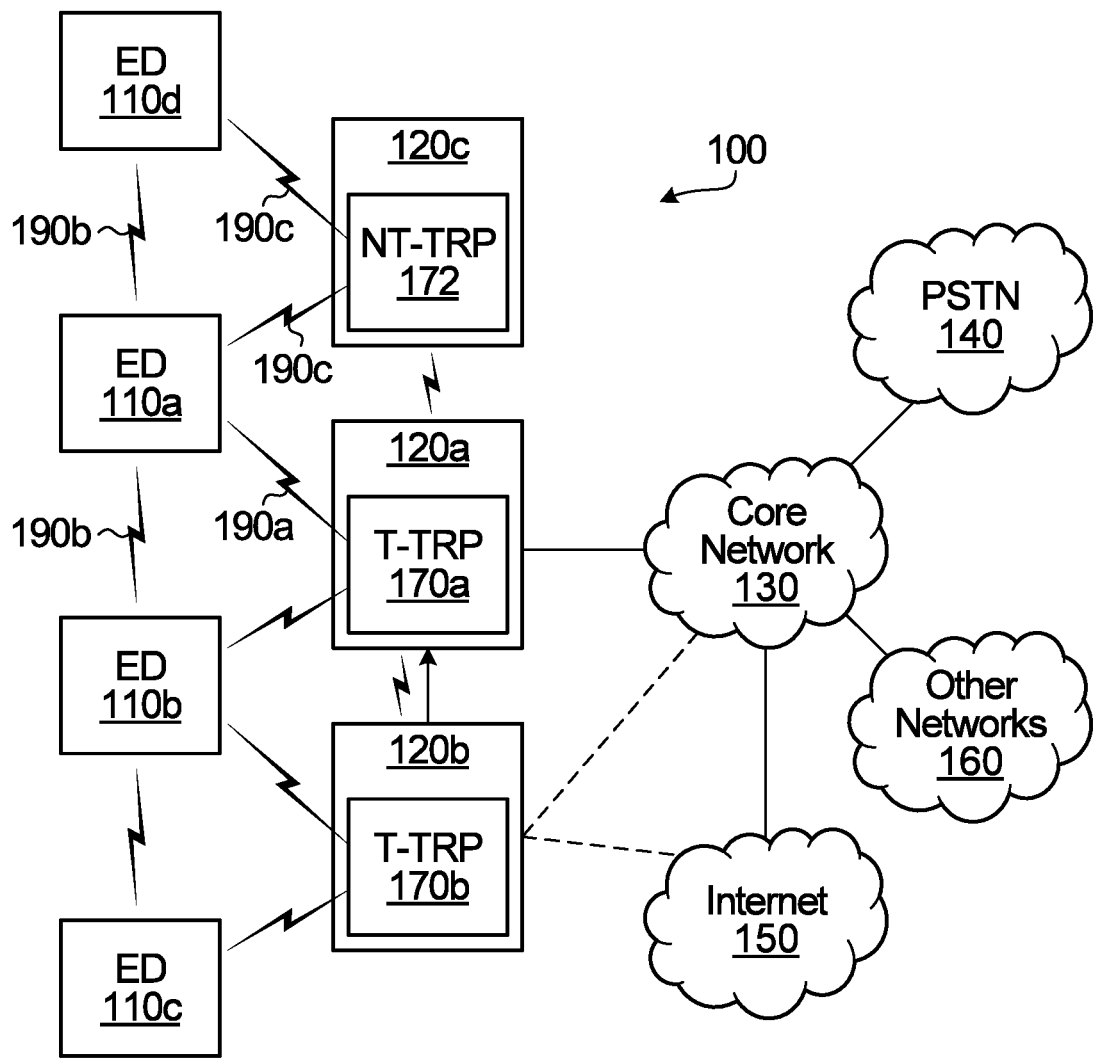
FIG. 2 is a block diagram illustrating another example communication system.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered subsystems of the communication system. In the example shown, the communication system 100 includes electronic devices (ED) 110a-110d (generically referred to as ED 110), radio access networks (RANs) 120a-120b, non-terrestrial communication network 120c, a core network 130, a public switched telephone network (PSTN) 140, the internet 150, and other networks 160. The RANs 120a-120b include respective base stations (BSs) 170a-170b, which may be generically referred to as terrestrial transmit and receive points (T-TRPs) 170a-170b. The non-terrestrial communication network 120c includes an access node 120c, which may be generically referred to as a non-terrestrial transmit and receive point (NT-TRP) 172.

Any ED 110 may be alternatively or additionally configured to interface, access, or communicate with any other T-TRP 170a-170b and NT-TRP 172, the internet 150, the core network 130, the PSTN 140, the other networks 160, or any combination of the preceding. In some examples, ED 110a may communicate an uplink and/or downlink transmission over an interface 190a with T-TRP 170a. In some examples, the EDs 110a, 110b and 110d may also communicate directly with one another via one or more sidelink air interfaces 190b. In some examples, ED 110d may communicate an uplink and/or downlink transmission over an interface 190c with NT-TRP 172.

The air interfaces 190a and 190b may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190a and 190b. The air interfaces 190a and 190b may utilize other higher dimension signal spaces, which may involve a combination of orthogonal and/or non-orthogonal dimensions.

The air interface 190c can enable communication between the ED 110d and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120a and 120b are in communication with the core network 130 to provide the EDs 110a 110b, and 110c with various services such as voice, data, and other services. The RANs 120a and 120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a and 120b or EDs 110a 110b, and 110c or both, and (ii) other networks (such as the PSTN 140, the internet 150, and the other networks 160). In addition, some or all of the EDs 110a 110b, and 110c may include functionality for communicating with different wireless networks over different wireless links using different wireless technologies and/or protocols. Instead of wireless communication (or in addition thereto), the EDs 110a 110b, and 110c may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110a 110b, and 110c may be multimode devices capable of operation according to multiple radio access technologies, and incorporate multiple transceivers necessary to support such technologies.

Figure 3:
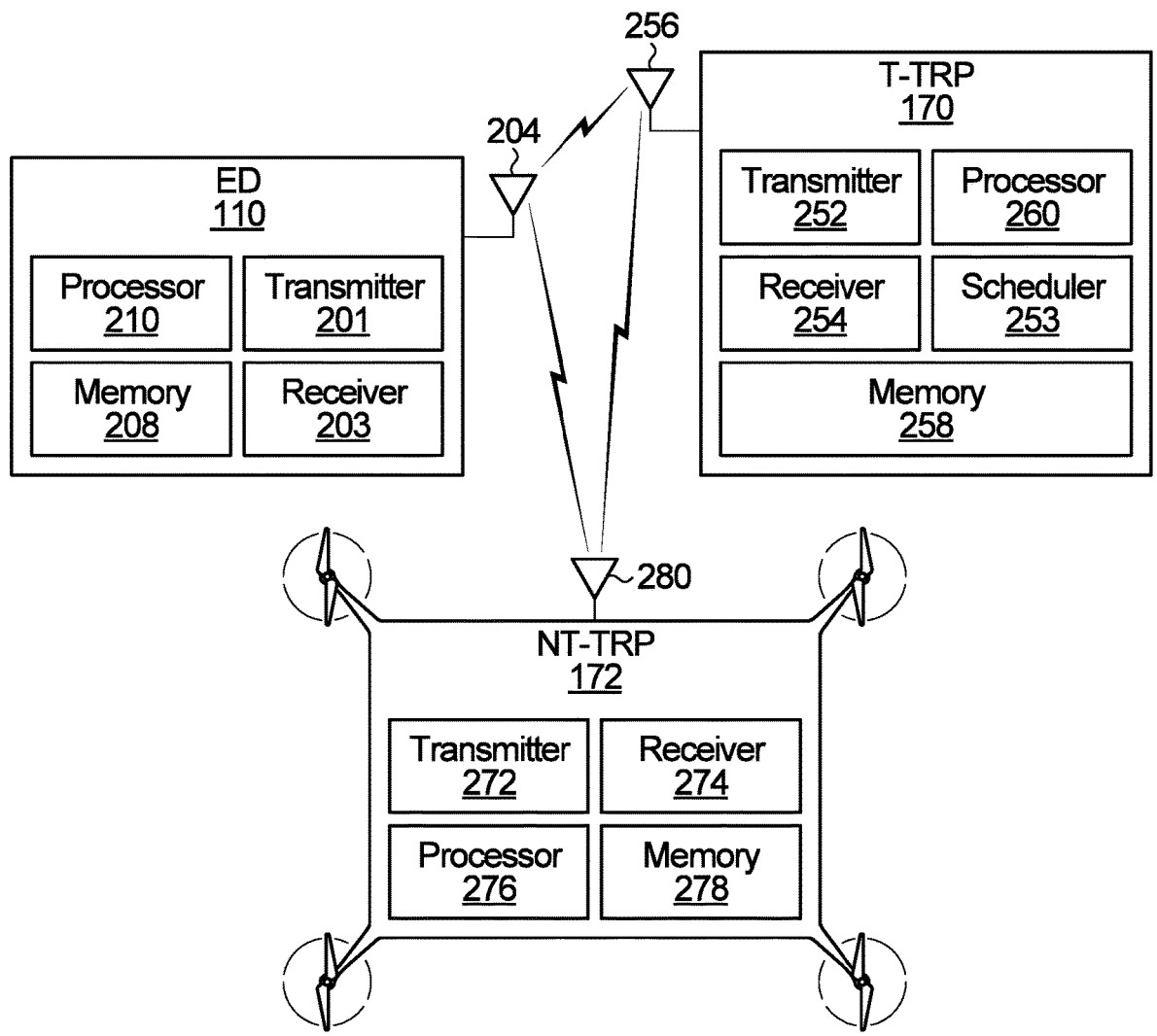
FIG. 3 is a block diagram illustrating example electronic devices and network devices.

FIG. 3 illustrates another example of an ED 110 and network devices, including a base station 170a, 170b (at 170) and an NT-TRP 172. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170a and 170b is a T-TRP and will hereafter be referred to as T-TRP 170. Also shown in FIG. 3, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 210 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distributed unit (DU), positioning node, among other possibilities. The T-TRP 170 may be macro BSs, pico BSs, relay node, donor node, or the like, or combinations thereof. The T-TRP 170 may refer to the forging devices, or to apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. multiple-input multiple-output (MIMO) precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

Figure 4:
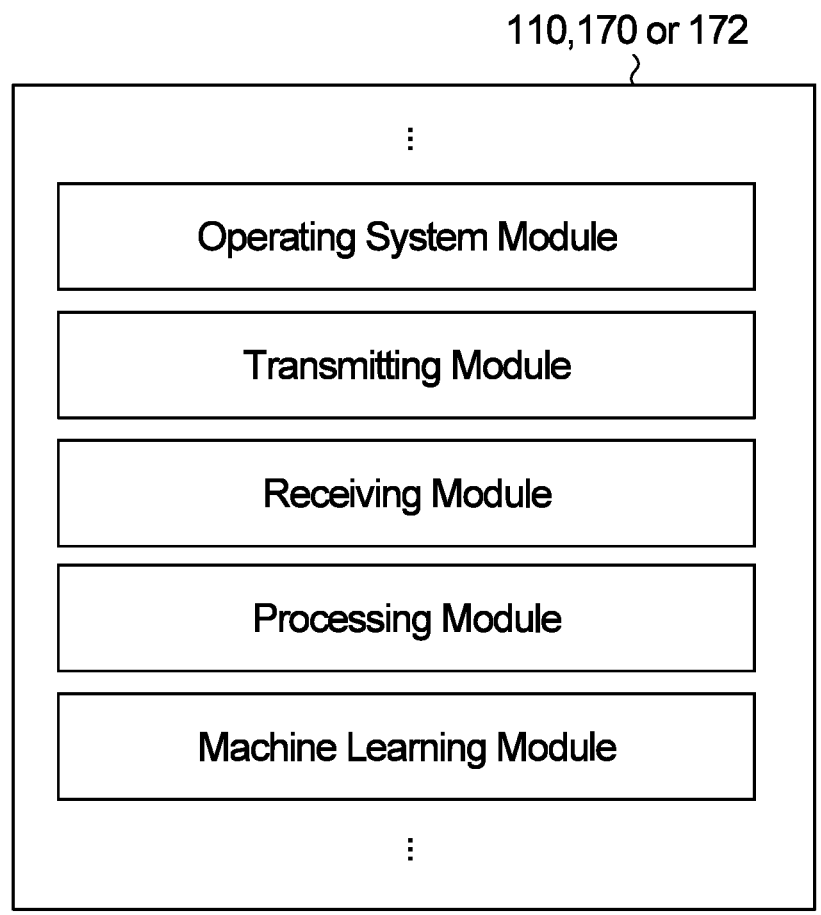
FIG. 4 is a block diagram illustrating units or modules in a device.

One or more steps of the embodiment methods provided herein may be performed by corresponding units or modules, according to FIG. 4. FIG. 4 illustrates units or modules in a device, such as in ED 110, in T-TRP 170, or in NT-TRP 172. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

An air interface generally includes a number of components and associated parameters that collectively specify how a transmission is to be sent and/or received over a wireless communications link between two or more communicating devices. For example, an air interface may include one or more components defining the waveform(s), frame structure(s), multiple access scheme(s), protocol(s), coding scheme(s) and/or modulation scheme(s) for conveying information (e.g. data) over a wireless communications link. The wireless communications link may support a link between a radio access network and user equipment (e.g. a "Uu" link), and/or the wireless communications link may support a link between device and device, such as between two user equipments (e.g. a "sidelink"), and/or the wireless communications link may support a link between a non-terrestrial (NT)-communication network and user equipment (UE). The following are some examples for the above components:

A waveform component may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF).

A frame structure component may specify a configuration of a frame or group of frames. The frame structure component may indicate one or more of a time, frequency, pilot signature, code, or other parameter of the frame or group of frames.

A multiple access scheme component may specify multiple access technique options, including technologies defining how communicating devices share a common physical channel, such as: Time Division Multiple Access (TDMA), Frequency Division Multiple Access (FDMA), Code Division Multiple Access (CDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, multiple access technique options may include: scheduled access vs. non-scheduled access, also known as grant-free access; non-orthogonal multiple access vs. orthogonal multiple access, e.g., via a dedicated channel resource (e.g., no sharing between multiple communicating devices); contention-based shared channel resources vs. non-contention-based shared channel resources, and cognitive radio-based access.

A hybrid automatic repeat request (HARQ) protocol component may specify how a transmission and/or a re-transmission is to be made. Non-limiting examples of transmission and/or re-transmission mechanism options include those that specify a scheduled data pipe size, a signaling mechanism for transmission and/or re-transmission, and a re-transmission mechanism.

A coding and modulation component may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to the constellation (including, for example, the modulation technique and order), or more specifically to various types of advanced modulation methods such as hierarchical modulation and low PAPR modulation.

In some embodiments, the air interface may be a "one-size-fits-all concept". For example, the components within the air interface cannot be changed or adapted once the air interface is defined. In some implementations, only limited parameters or modes of an air interface, such as a cyclic prefix (CP) length or a multiple input multiple output (MIMO) mode, can be configured. In some embodiments, an air interface design may provide a unified or flexible framework to support below 6 GHz and beyond 6 GHz frequency (e.g., mmWave) bands for both licensed and unlicensed access. As an example, flexibility of a configurable air interface provided by a scalable numerology and symbol duration may allow for transmission parameter optimization for different spectrum bands and for different services/devices. As another example, a unified air interface may be self-contained in a frequency domain, and a frequency domain self-contained design may support more flexible radio access network (RAN) slicing through channel resource sharing between different services in both frequency and time.

Figure 5:
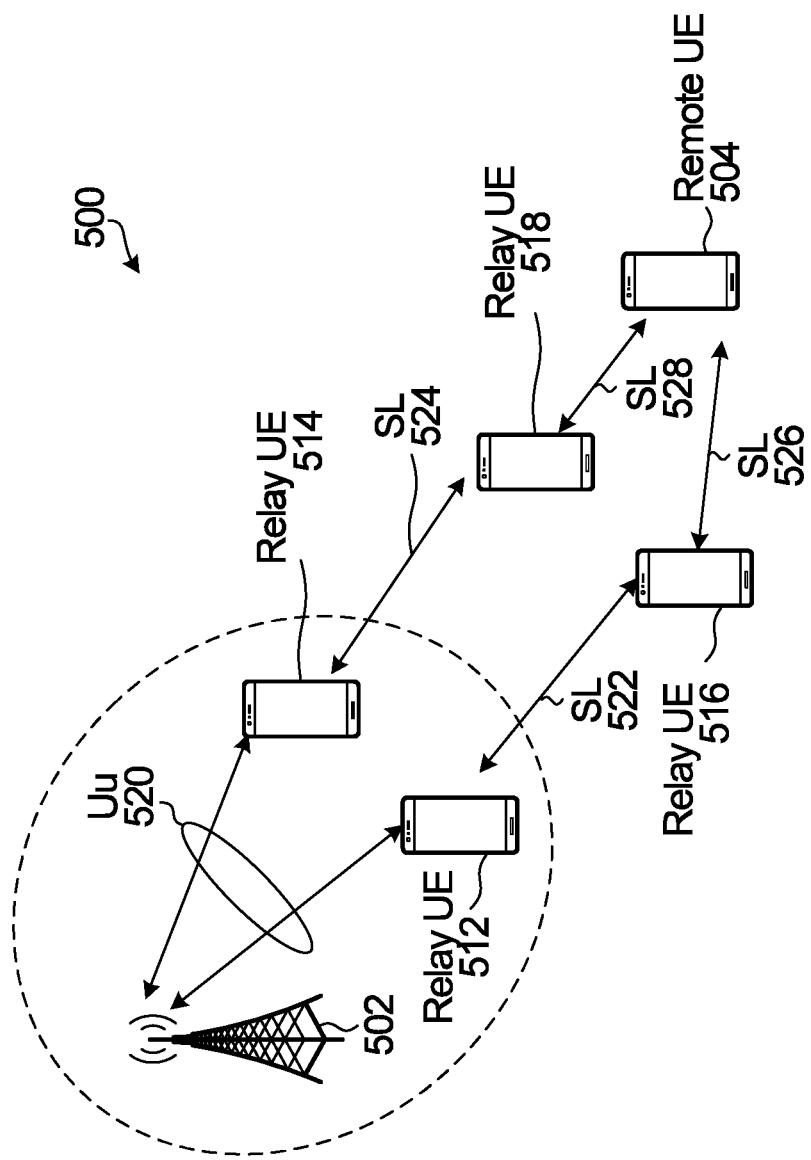
FIG. 5 is a block diagram of another example communication system illustrating UE cooperation and multi-hop communication paths.

FIG. 5 is a block diagram of another example communication system illustrating UE cooperation and multi-hop communication paths. The example system 500 includes network equipment 502, also referred to herein as a network device, and UEs 504, 512, 514, 516, 518. In a cellular network, a UE could connect to a network directly, through a direct communication link such as a so-called "Uu" link or another cellular link, over a Uu air interface for example. The UEs 512, 514 are "in-coverage" (within a geographical area of direct communication with the network device 502) as shown by the dashed line in FIG. 5, and communications between these UEs and the network device are through direct communication links shown by way of example as "Uu" links 520 in FIG. 5. Sidelink (SL) communications directly between the UEs 512, 516, directly between the UEs 514, 518, directly between the UEs 516, 504, and directly between the UEs 518, 504 are through respective sidelinks 522, 524, 526, 528. Examples of these components and implementation options for communications between these components are provided elsewhere herein. Network device 502 may be a network node 170a, 170b in FIG. 1 and the UEs may be EDs 110a-j in FIG. 1, for example.

UE cooperation may be used in the example in FIG. 5 to have the UEs 512, 514, or the UEs 516, 518, or all of these UEs, operate as relay UEs to assist the remote UE 504 with either or both of uplink and downlink communications with the network device 502. Although reference is made primarily to "relay UEs" herein, relay UEs may also or instead be referred to as cooperating UEs or cooperative UEs (CUEs), or otherwise, both herein and elsewhere.

Two multi-hop paths between the network device 502 and the remote UE 504 are shown in FIG. 5. One multi-hop path involves the relay UEs 512, 516, a Uu segment or link at 520, and sidelink segments or links at 522, 526. The other multi-hop path in this example involves the relay UEs 514, 518, a Uu segment or link at 520, and sidelink segments or links at 524, 528. In another possible embodiment, multiple UEs cooperate to relay data in each hop, such as at 512/514 and at 516/518, to provide a multi-hop path for which there are multiple link options for each hop. A "hop" is defined herein to refer to a relay topology comprising a relay UE or relay node between two other nodes. For example, a first hop refers to a topology for relaying data, by a first UE, from a source node to a second UE along a relay path, while a second hop refers to a topology to further relay the data along the relay path, by the second UE to a third UE, and so on and so forth. Therefore according to the above definition, a "multi-hop" relay path includes at least two consecutive relay nodes. Although "hop" is sometimes defined differently elsewhere to refer to the links between nodes, a conventional single relay topology includes two links between nodes (i.e., a first link between a first node and a second node, and a second link between the second node and a third node), and thus includes two hops according to the alternative definition. However, the conventional single relay topology, despite including two links, is not a "multi-hop" relay path according to the present disclosure.

For downlink transmission in the example 500, in an embodiment a gNB at 502 sends data to one or both of the in-coverage relay UEs 512, 514 on a Uu link 520, and each relay UE 512, 514 that receives the data from the gNB relays the data to the next relay UE 516, 518 over a respective sidelink 522, 524. Similarly, each relay UE 516, 518 that receives the data relays the data to the remote UE 504 over a respective sidelink 526, 528. In general, a multi-hop path according to the present disclosure includes at least one UE-UE link or segment, between two different "hops" as defined above, that involves direct communications between different UEs. In this downlink transmission example, there is a UE-UE segment between UEs of the hop at 512/514 and the hop at 516/518.

Regarding uplink transmission, in an embodiment the remote UE 504 transmits data to one or both of the nearby relay UEs 516, 518 over the sidelinks 526, 528, each of these relay UEs that receives the data from the remote UE 504 relays the data to its next relay UE 512, 514 over the sidelinks 522, 524, and each of the relay UEs 512, 514 that receives the data relays the data to the network device 502 over a Uu link 520. This uplink transmission example also involves a multi-hop path with a UE-UE segment between two hops.

FIG. 5 is a non-limiting and illustrative example. The features disclosed herein may be implemented in conjunction with other communication systems having similar or different structures or topologies. In other embodiments, UEs 516 and/or 518 could also be in coverage. More generally, any number of relay UEs could be in or out of coverage. Although the example in FIG. 5 and other examples herein refer to multi-hop relay, relay communications may involve one or more hops.

Figure 6:
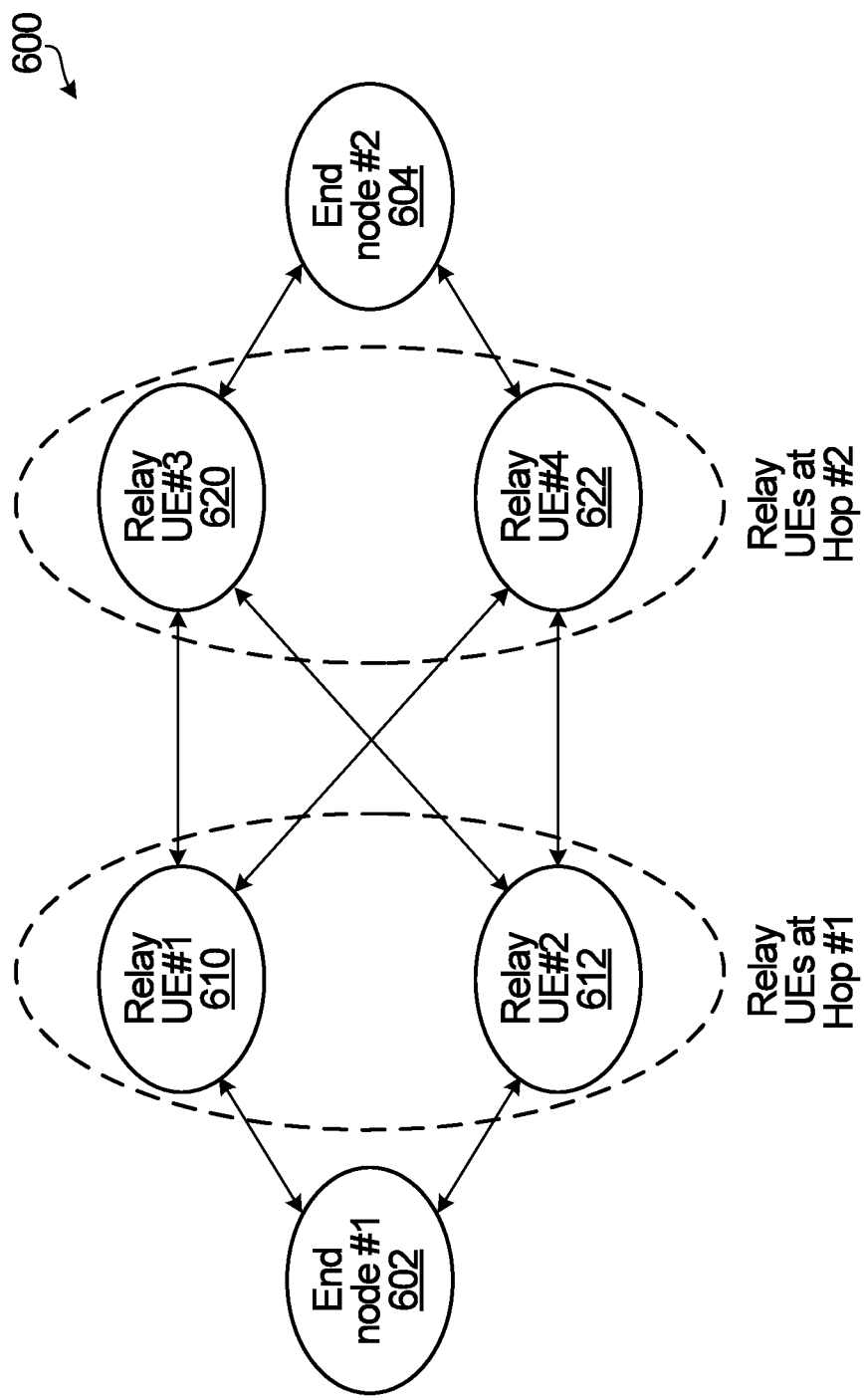
FIG. 6 is a block diagram illustrating another example of multi-hop communication paths.

FIG. 6 is a block diagram illustrating another example of multi-hop communication paths. The example 600 in FIG. 6 is similar in structure to the example in FIG. 5, but provides a more general example of a multi-hop communication path. As shown, the example in FIG. 6 includes an end node #1 at 602 and an end node #2 at 604, and subsets of relay UEs including one or more relay UEs for relaying data in each of two hops. Relay UE #1 and relay UE #2 are shown at 610, 612 relaying data for hop #1, and relay UE #3 and relay UE #4 are shown at 620, 622 relaying data for hop #2. In general, a subset of relay UEs that handle relaying of data in any hop may include one more relay UEs, and subsets may be the same or different sizes. The present disclosure is not limited to any particular number of hops, or to any particular number of relay UEs for any hop.

Relay UEs that are involved in forwarding data are referred to herein as relaying data, potentially "in" respective hops of multi-hop relay, but may also or instead be described as being "at" each hop. UE relay involves relaying data by at least one UE in at least one hop along a relay path, and multi-hop relay involves relaying data in multiple steps or hops along a multi-hop communication path, between end nodes. In each hop, one or more relay UEs relay the data to either an end node or one or more relay UEs involved in relaying the data in a next hop. In some embodiments, a hop involves reception of data to be relayed, from one or more relay UEs or an end node, and transmission of that received data to one or more other relay UEs or another end node.

In FIG. 6, transmission could be initiated from either end node #1 or end node #2 and terminated at the other end node via the relay UE(s) at hop #1 and hop #2 in the example shown. In general, the relay UEs relay data in respective hops between the end nodes along a multi-hop communication path. The transmission from one end node to the other end node may go through one or more relay UEs during relay in each of multiple hops, and thus a communication path as shown in FIG. 6 is referred to herein as a multi-hop path or multi-hop relay. Single-hop paths or single-hop relay in which there is only one hop or only one subset of relay UEs between two end nodes are also possible.

The following should be noted in respect of FIG. 6:

Each end node could be a user device such as a UE or a network device such as a gNB, TRP, or another type of network node. FIG. 6 and other embodiments herein are therefore intended to encompass both UE-to-network relay and UE-to-UE relay scenarios. UE-to-network is used herein as a general phrase that is intended to encompass communications in either direction between a UE and a network device, unless otherwise indicated.

A relay UE could be denoted as a CUE, because it cooperates to help an end node with transmission and/or reception. A relay UE as referenced herein is intended to encompass, for example, a Layer 1 (L1) relay UE, a Layer 2 (L2) relay UE, a Layer 3 (L3) relay UE, and other types of relay UEs. Relay UEs support at least forwarding of data, and may also support some form of data processing, such as decoding data to determine that data is to be relayed and is not destined to the relay UE itself. Other data processing, such as amplifying data before forwarding, may also or instead be supported by a relay UE. Relay UEs are not limited to these particular example operations.

Each link between a relay UE and either another relay UE or an end node could use, for example, a sidelink (e.g., Power Class 5 (PC5)) air interface, a Uu link air interface, or another type of air interface (such as WiFi, Bluetooth, etc.).

The end node at which a data transmission is initiated can be referred to as a source node or source of traffic, while the end node at which a data transmission is terminated can be referred to as a destination node or target node.

Communications between two end nodes may be bidirectional. For example, end node #1 may transmit data to end node #2, and end node #2 may transmit data to end node #1. One node may therefore be the source node or the target node for different data transmissions.

For relay communications that involve UC, an end-to-end HARQ process could be configured or enabled such that the same HARQ process, which is denoted, identified, or otherwise indicated by the same HARQ process ID, is used to carry the same data, or related data such as different redundancy versions (RVs) of the same data, on Uu or SL links or segments between the same source and destination end nodes. This could help a relay UE and/or an end node to determine whether data is correctly received and decoded when multiple copies of the same data or related data such as different RVs are transmitted or relayed from different nodes, such as from different relay UEs or from a relay UE and directly from an end node, for example. If a source-destination end node pair is fixed, then the same HARQ ID on different links between the pair of the end nodes could identify received transmissions as including the same data or related data.

An end-to-end HARQ process as disclosed herein is defined as a HARQ process associated with transmitting data between source and destination end nodes. Conventionally, a multi-hop data transmission relies on multiple hop-by-hop HARQ processes between respective pairs of consecutive nodes in a path between the end nodes. For example, an end-to-end HARQ process with ID #1 on different Uu or SL links could indicate that the same data or related data transmitted on those links.

An end-to-end HARQ process spans or encompasses transmission of data over multiple links. Transmission of data over multiple links as part of a single HARQ process may include an initial transmission and one or more re-transmissions. Although reference is made herein to transmission and re-transmission of data, unless indicated otherwise such references are intended to generally indicate or include transmission of exactly the same data or related versions, such as different RVs, of that data. In a more general way, the related version may mean the same information is carried but with different header information inserted by higher layer such as MAC or above. Thus, transmitting data as part of an end-to-end HARQ process may involve transmitting the data or different versions of the data. The multiple links over which data is transmitted may include different links between nodes in a single path such as a UE relay path from a source end node to a destination end node, and/or different links in different paths from a source end node to a destination end node. In this sense, an end-to-end HARQ process may also or instead be considered to be a form of "joint" HARQ process that spans multiple links, or may involve transmissions over multiple links.

Further regarding data, references to transmitting and receiving data, for example, are intended to be inclusive of transmitting and receiving only such data, or data as well as other information such as header information or other information involved in communicating data in a network or system.

Figure 7:
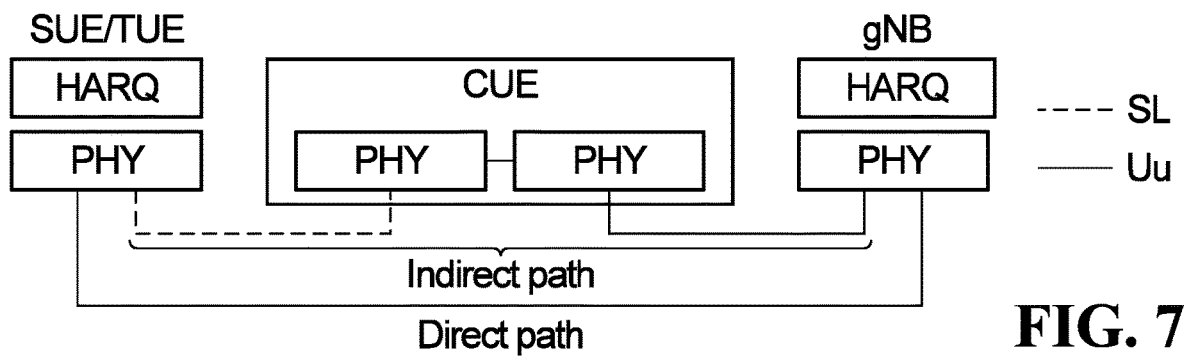
FIG. 7 is a block diagram illustrating example HARQ protocol stacks according to an embodiment that involves an indirect relay path and a direct path between a UE and a network device.

FIG. 7 is a block diagram illustrating example HARQ protocol stacks according to an embodiment that involves an indirect relay path and a direct path between a UE and a network device. In this example, a HARQ entity that manages an end-to-end HARQ process exists only at the source and the destination of traffic. In general, a HARQ entity is an entity to manage one or more HARQ processes, such as up to sixteen HARQ processes for example. In some embodiments, a HARQ entity may manage both end-to-end HARQ processes as well as conventional hop-by-hop HARQ processes. For uplink traffic the source is a source UE (SUE) and the destination is a network device shown by way of example as a gNB in FIG. 7, and for downlink traffic the source is the network device and the destination is a TUE. Transmissions as part of an end-to-end HARQ process may occur on all paths between the source and destination, and in FIG. 7 the paths include a direct Uu path and an indirect relay path through a relay UE, which is shown by way of example as a CUE.

A CUE or relay UE, as shown, may include a PHY layer for each link to which it connects. Thus, a relay UE may keep the same transport block (TB) between its connected links. A CUE or relay UE may have medium access control (MAC) and/or higher layers (not shown) in other embodiments, and therefore a TB received by a CUE on one link and transmitted on another link could differ due to changed header information from the MAC or higher layers even though the data or information bits are kept the same.

More generally, FIG. 7 illustrates features that are relevant to an example end-to-end HARQ process, and other features or functions may be provided or supported.

Figure 8:
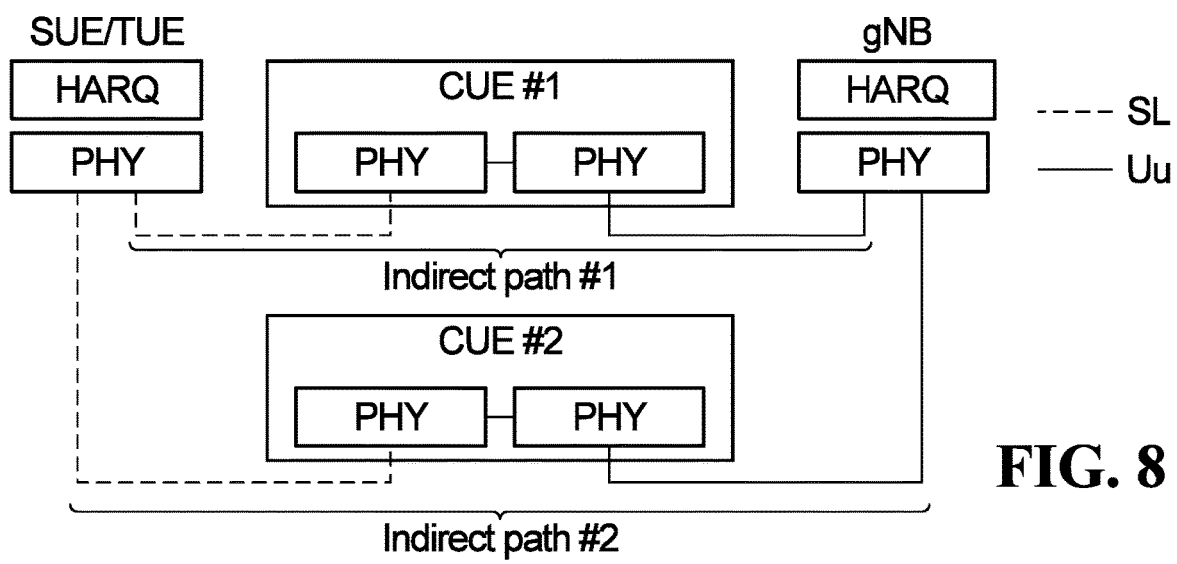
FIG. 8 is a block diagram illustrating example HARQ protocol stacks according to another embodiment that involves two indirect relay paths between a UE and a network device.

FIG. 8 is a block diagram illustrating example HARQ protocol stacks according to another embodiment that involves two indirect relay paths between a UE and a network device. The example in FIG. 8 is substantially the same as the example in FIG. 7, with the exception that there are two indirect relay paths in FIG. 8, through CUE #1 and CUE #2, respectively.

Figure 9:
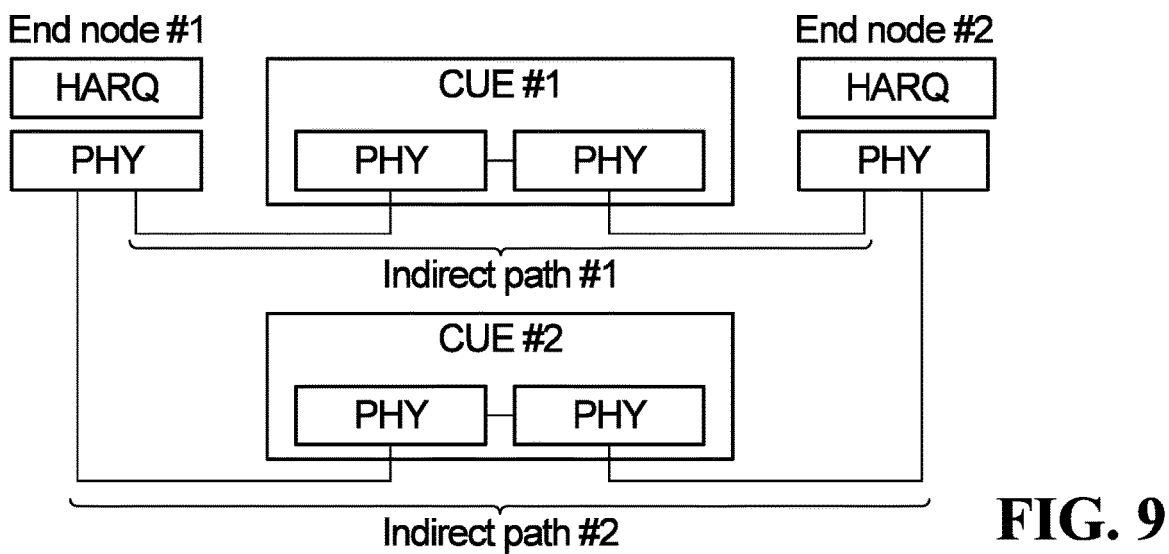
FIG. 9 is a block diagram illustrating example HARQ protocol stacks according to a further embodiment that involves two indirect relay paths between two end nodes.

FIG. 9 is a block diagram illustrating example HARQ protocol stacks according to a further embodiment that involves two indirect relay paths between two end nodes. The example in FIG. 9 is substantially the same as the example in FIG. 8, with the exception that the source and destination are generalized to end nodes in FIG. 9, each of which may be a UE or a network device, for example. Similarly, either or both of the links in each indirect relay path may be a Uu link or an SL link, depending upon whether each end node is a UE or a network device.

FIGS. 7 to 9 illustrate several embodiments, including different examples of links and paths to which end-to-end HARQ as disclosed herein may be applied, and thus the HARQ entities shown in these examples are intended to manage the end-to-end HARQ process. Other embodiments may vary from the embodiments shown in FIGS. 7 to 9 or otherwise disclosed herein. For example, in other embodiments a HARQ entity is not restricted only to source and destination end nodes. HARQ processes may also be applied for hop-by-hop transmissions. At least some HARQ features or a partial HARQ entity may exist in intermediate nodes, for example, so that hop-by-hop HARQ processes could be applied on a per-link basis in a multi-link path such as a in hop-by-hop relay.

In general, a HARQ entity at each UE or node, including source and destination end nodes, could manage both end-to-end HARQ processes and hop-by-hop HARQ processes. A HARQ entity may exist on the source and destination end nodes, as well as on each intermediate node such as a UE in the case of UE relay. Managing an end-to-end HARQ process on an intermediate node, however, could be different from that on the source and destination nodes. For example, an end-to-end HARQ process on the source and destination nodes may involve sending, by the destination end node, and receiving, by the source end node, end-to-end HARQ feedback, whereas intermediate nodes along a relay path may just send and receive hop-by-hop HARQ feedback. In addition, a hop-by-hop HARQ process could be configured between any consecutive nodes along a relay path and be managed by HARQ entities on those nodes, and thus the HARQ entities on any node, or each node, in a path may manage one or more hop-by-hop HARQ processes as well as one or more end-to-end HARQ processes.

For each pair of source-destination nodes, a number of end-to-end HARQ processes could be configured and mapped to a generalized HARQ process. For example, a node may support a certain number of generalized HARQ processes, and those generalized HARQ processes may include one or more end-to-end HARQ processes and one or more hop-by-hop HARQ processes. Generalized HARQ processes refer a set of HARQ processes, some of which may be end-to-end HARQ processes and some of which could be hop-by-hop HARQ processes. For example, a UE could be configured with ten generalized HARQ processes, of which five HARQ processes could be end-to-end HARQ processes and the remaining five could be hop-by-hop HARQ processes. Such generalized HARQ processes could be configured using high layer signaling such as radio resource control (RRC) signaling, which could indicate a total number of generalized HARQ processes, a number of end-to-end HARQ processes, and a number of hop-by-hop HARQ processes. The end-to-end HARQ process and hop-by-hop HARQ process could be switched by explicit signaling. For example an explicit signaling in lower layer such as downlink control information (DCI) or as a higher layer signal can be used to indicate the switching between end-to-end HARQ process and hop-by-hop HARQ process more dynamically. Corresponding UE behaviors (as relay UEs, for example) could change correspondingly.

Suppose that a node may support up to eight HARQ processes at any time. In such a scenario:
- for a pair of source #1→destination #1, two end-to-end HARQ processes could be configured and mapped to generalized HARQ process #1 and #2;
- for pair of source #2→destination #2, three end-to-end HARQ processes could be configured and mapped to generalized HARQ process #3-#5; and
- for pair of source #3→destination #2, three end-to-end HARQ processes could be configured and mapped to generalized HARQ process #6-#8.

Figure 10:
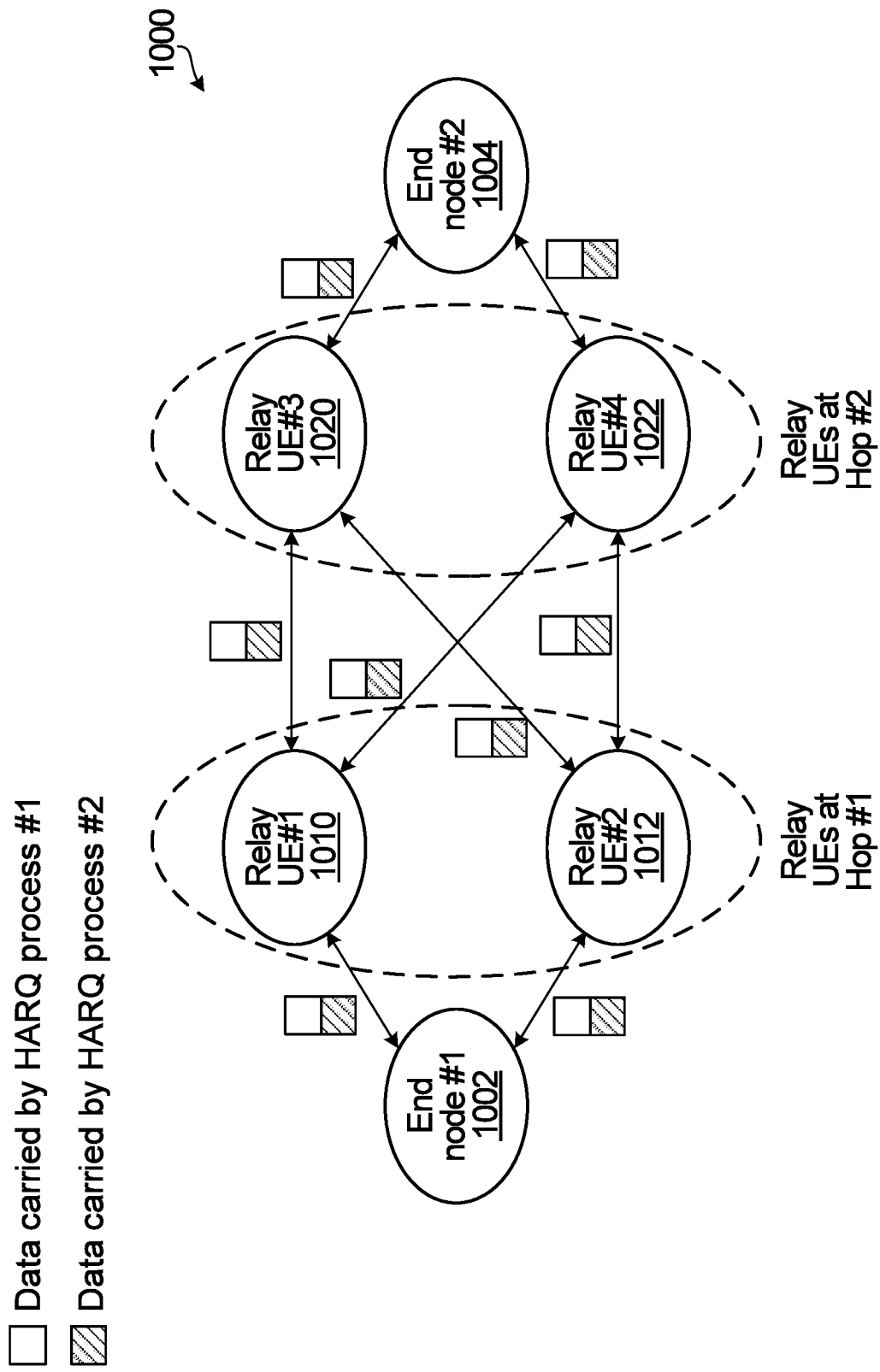
FIG. 10 is a block diagram illustrating an example of HARQ processes for multi-hop communication paths.

FIG. 10 is a block diagram illustrating an example of HARQ processes for multi-hop communication paths. The example 1000 in FIG. 10 relates to a scenario of two end-to-end HARQ processes for multi-hop UE relay between end nodes 1002, 1004 through relay UEs 1010/1012 and 1020/1022 at each of two hops.

An end-to-end HARQ process could be applied on each of multiple paths, and each link of a relay path, between the same pair of source and destination end nodes. Consider the upper path in FIG. 10, for example. The same HARQ process, with the same HARQ ID, may be used to carry the same data, or related data such as different RV versions, on all links between the source and destination end nodes 1002, 1004, including a Uu or SL link between the end node 1002 and the relay UE 1010, an SL link between the relay UEs 1010, 1020, and a Uu or SL link between the relay UE 1020 and the end node 1004. In the example shown, there are two HARQ processes, for different data. This is just an example, and more or fewer than two HARQ processes may be used in other embodiments.

In a scenario in which there are multiple relay paths existing between a pair of source and destination nodes, as in FIG. 10, one or more end-to-end HARQ processes could be applied on each link (e.g., Uu and SL links) of each relay path between the same pair of source and destination end nodes. The same end-to-end HARQ process may be used to carry the same data or related data such as different RV versions, on all links between the source and destination end nodes.

FIG. 10 illustrates an embodiment in which there may be four relay paths, including:
- relay path #1: end node #1 1002↔Relay UE #1 1010↔relay UE #3 1020↔end node #2 1004;
- relay path #2: end node #1 1002↔relay UE #2 1012↔relay UE #4 1022↔end node #2 1004;
- relay path #3: end node #1 1002↔relay UE #1 1010↔relay UE #4 1022↔end node #2 1004;
- relay path #4: end node #1 1002↔relay UE #2 1012↔relay UE #3 1020↔end node #2 1004.

As shown in FIG. 10, the same data or related data are transmitted as part of each of the two end-to-end HARQ processes over each link (between consecutive nodes) of each multi-link path, which includes multiple links in the example shown.

In some embodiments, an end-to-end HARQ process could be mapped to or otherwise configured to use a HARQ buffer on a relay UE or node on a relay path between source and destination nodes. The mapping or configuration of a HARQ buffer for the same end-to-end HARQ process could be the same or different for each relay UE or node. For example, an end-to-end HARQ process could be mapped to a k-th HARQ buffer of each relay UE or node along a relay path, and in this sense the same end-to-end HARQ process may use the same HARQ buffer (the HARQ buffer with the same index) at each relay UE or node. In other embodiments, an end-to-end HARQ process is configured to use an available HARQ buffer, which may be the same buffer or a different buffer, at each relay UE or node.

As end-to-end HARQ processes and hop-by-hop HARQ processes could be configured or supported simultaneously, for potentially more flexible or efficient HARQ resource usage, one or more end-to-end HARQ buffers for one or more end-to-end HARQ processes and one or more hop-by-hop HARQ buffers for one or more hop-by-hop HARQ processes could be allocated. The end-to-end HARQ buffers may be allocated separately in different buffers or memory spaces, or in the same, shared HARQ buffer. For example, a shared HARQ buffer at a relay UE or node may be configured as a HARQ buffer for a certain number of individual HARQ processes, and the configuration of end-to-end HARQ buffers could overlap with that of hop-by-hop HARQ buffers, such that a shared HARQ buffer or memory space could be allocated to one or more end-to-end HARQ buffers for one or more end-to-end HARQ processes. Any remaining HARQ buffer or memory space on a relay UE or node could still be configured for one or more hop-by-hop (or per-hop) HARQ buffers associated with one or more hop-by-hop (or per-hop) HARQ processes.

Figure 11:
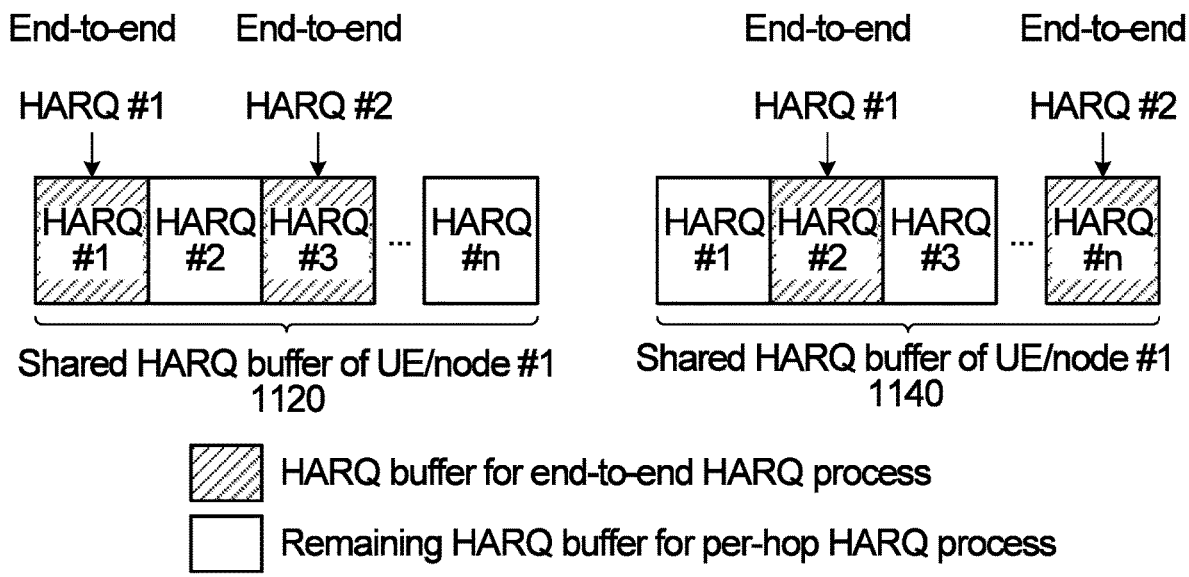
FIG. 11 is a block diagram illustrating an example HARQ buffer configuration.

FIG. 11 is a block diagram illustrating an example HARQ buffer configuration. In the example shown, a HARQ buffer or memory space 1120, 1140 at each of two UEs or nodes can accommodate separate HARQ buffers for up to n HARQ processes, and two end-to-end HARQ buffers are configured at each UE or node for two end-to-end HARQ processes, shown as HARQ #1 and joint HARQ #2. This example illustrates different HARQ buffers being allocated to each end-to-end HARQ process at each UE or node, including HARQ buffer #1 at UE/node #1 and HARQ buffer #2 at UE/node #2 for end-to-end HARQ#1, and HARQ buffer #3 at UE/node #1 and HARQ buffer #n at UE/node #2 for end-to-end HARQ#2. In other embodiments, the same buffer with the same index at each UE or node is allocated to the same end-to-end HARQ process.

Each of the two end-to-end HARQ processes in FIG. 11 is mapped to or otherwise configured to use a HARQ buffer on each relay UE or node on a relay path between source and destination nodes. The mapping/configuration of the HARQ buffer for the same HARQ process could be the same for each UE/node, or different for each UE/node as shown.

End-to-end HARQ buffers and hop-by-hop or per-hop buffers share the same HARQ buffer or memory space in FIG. 11. There are two end-to-end HARQ buffers in FIG. 11, and the other remaining n−2 HARQ buffers may be allocated, as needed, to other HARQ processes. These remaining HARQ buffers may be mapped, configured, or otherwise allocated to other end-to-end or hop-by-hop (or per-hop) HARQ processes.

Figure 12:
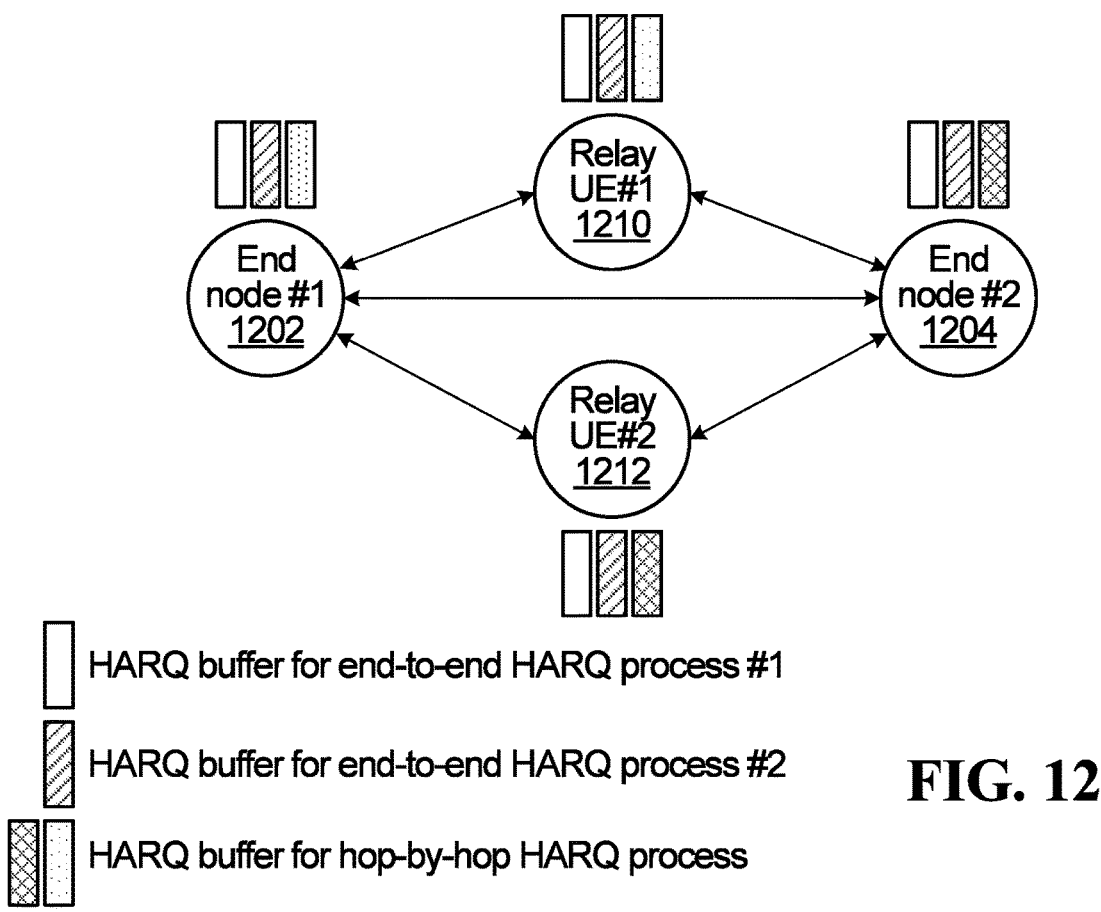
FIG. 12 is a block diagram illustrating an example of multi-path communications with end-to-end HARQ process buffer and hop-by-hop HARQ process buffer allocations.

FIG. 12 is a block diagram illustrating an example of multi-path communications with end-to-end HARQ process buffer and hop-by-hop HARQ process buffer allocations. The example in FIG. 12 shows end-to-end HARQ process buffers at each node, including each end node 1202, 1204 and each relay UE 1210, 1212, and HARQ buffers for per-hop HARQ processes at the end node #1 1202 and relay UE #1 1210 for the link between end node #1 and relay UE #1, and at the relay UE #2 1212 and the end node #2 1204 for the link between relay UE #2 and end node #2. An end-to-end HARQ process may encompass all of the links between the end nodes 1202, 1204 in FIG. 12, and therefore an end-to-end HARQ buffer may be configured on each UE/node on all links between the end nodes 1202 and 1204. In addition, link, hop-by-hop, or per-hop HARQ processes could be configured individually for any or all of the individual links between end nodes 1202 and 1204.

Regarding resource allocation for joint HARQ process transmission(s), there are several possible options.

For example, the resource(s) used to relay data could be pre-configured and triggered by a control signal or signaling, such as signaling that includes downlink control information (DCI) in the case of a Uu link or sidelink control information (SCI) in the case of an SL link or segment. The DCI/SCI may carry an end-to-end HARQ ID to indicate that the transmission is part of the corresponding HARQ process that is denoted by the HARQ ID. Such resources can be shared with other HARQ processes in some embodiments, and nodes such as relay UEs could identify a transmission (for a particular end-to-end HARQ process) from HARQ ID in SCI (plus source and destination information). This could save resource overhead. In the context of enabling pre-configured resources, triggering may mean that when a node such as a UE receives the DCI/SCI or other signaling that carries an end-to-end HARQ ID, it shall assume that the resources that are to be used to transmit the data further could start after a time-offset from the time or moment of that reception. Other triggering approaches are also possible.

According to another option for resource allocation, the resources used to relay data could be scheduled, by a source node for example, and carried with the data or a control signal from the source node.

Resources used to relay data could instead be scheduled by the CUE (relay UE) that relays data, or by another component such as a network device, a master UE in a cooperation group, or even a destination node.

These options for allocating and triggering the use of resources for relaying data may also apply to allocating other resources associated with a HARQ process, such as allocating HARQ buffers for end-to-end HARQ processes and/or link or per-hop HARQ buffers for link or per-hop HARQ processes. In some embodiments, end-to-end and per-hop HARQ buffers are pre-allocated or otherwise pre-configured in the same shared HARQ buffer memory of a node. The triggering or enabling such allocations of end-to-end and per-hop HARQ buffers at a node could be responsive to the same signaling or separate signaling for each HARQ process.

Embodiments related to configuration of end-to-end HARQ processes, including HARQ buffers and/or other HARQ resources, facilitate end-to-end HARQ processing for multiple links of one or more paths between end nodes, and may be applied in multi-path and/or multi-hop communications to potentially improve system performance and latency.

Turning now to end-to-end HARQ procedures, in an embodiment end-to-end HARQ may involve scheduling an initial transmission of data, by a source node for example, and the source node transmitting the data toward a destination node. For a multi-link path, the data is transmitted to a next consecutive node over the link. Data may also or instead be transmitted to the destination node over a direct link or path to the destination node. In a multi-path scenario, the data is transmitted over multiple paths. An end-to-end HARQ ID for an end-to-end HARQ process between the source node and the destination node could be carried by a control signal scheduling the transmission, such as in DCI and/or SCI.

In a multi-link path, a next CUE (or relay UE) may attempt to decode the control signal and the corresponding data. If the next CUE or relay UE decodes the data successfully, then it further relays the data to its next CUE (relay UE) or the destination node. The same HARQ ID could be signaled in a control signal that is transmitted with the relayed data, for example.

Optionally, a HARQ-ACK could be sent as hop-by-hop feedback as part of an end-to-end HARQ process. Otherwise, a HARQ-NACK could be sent as hop-by-hop feedback. The transmitter could then send a re-transmission of the data, such as a different RV of the data.

The CUE or relay UE operations are repeated by further CUEs or relay UEs in a multi-hop path between the source and destination nodes.

If the destination node receives and decodes the data, then it could send an end-to-end HARQ-ACK as feedback for the end-to-end HARQ process; otherwise, it sends a HARQ-NACK as feedback.

Relay UE or destination node decoding behavior may involve identifying received data by its end-to-end HARQ process ID. The end-to-end HARQ ID can be carried by DCI/SCI, as described by way of example above, and the same end-to-end HARQ ID could indicate the same data or related data such as different RVs received over different links. Optionally, data could be identified by a end-to-end HARQ ID plus source and destination IDs. This may be useful, for example, to identify data associated with a particular HARQ process where a node is participating in multiple paths relaying data between different source/destination pairs.

After a receiving node such as a relay UE or destination node identifies received data as being part of the same HARQ process, through determining that their end-to-end HARQ process ID is the same for example, the receiving node may perform soft-combining of the received data or related data such as different RVs identified as being associated with the same end-to-end HARQ process but from different links on different paths, from different nodes such as different relay UEs or one or more relay UEs and a source node. In some embodiments, such soft-combining is based on an assumption that the same TB or different RVs of the same TB were transmitted and received as part of the same end-to-end HARQ process.

A receiving node may also or instead perform hard-combining of multiple received transmissions of the same data or related data such as different RVs of the same data. For hard-decoding, a receiving node attempts to separately decode the received data on the same end-to-end HARQ process from different links on different paths. If the data received from at least one path is decoded successfully, then the data is considered received successfully, and the receiving node may send HARQ-ACK feedback as shown by way of example in FIG. 13.

Figure 13:
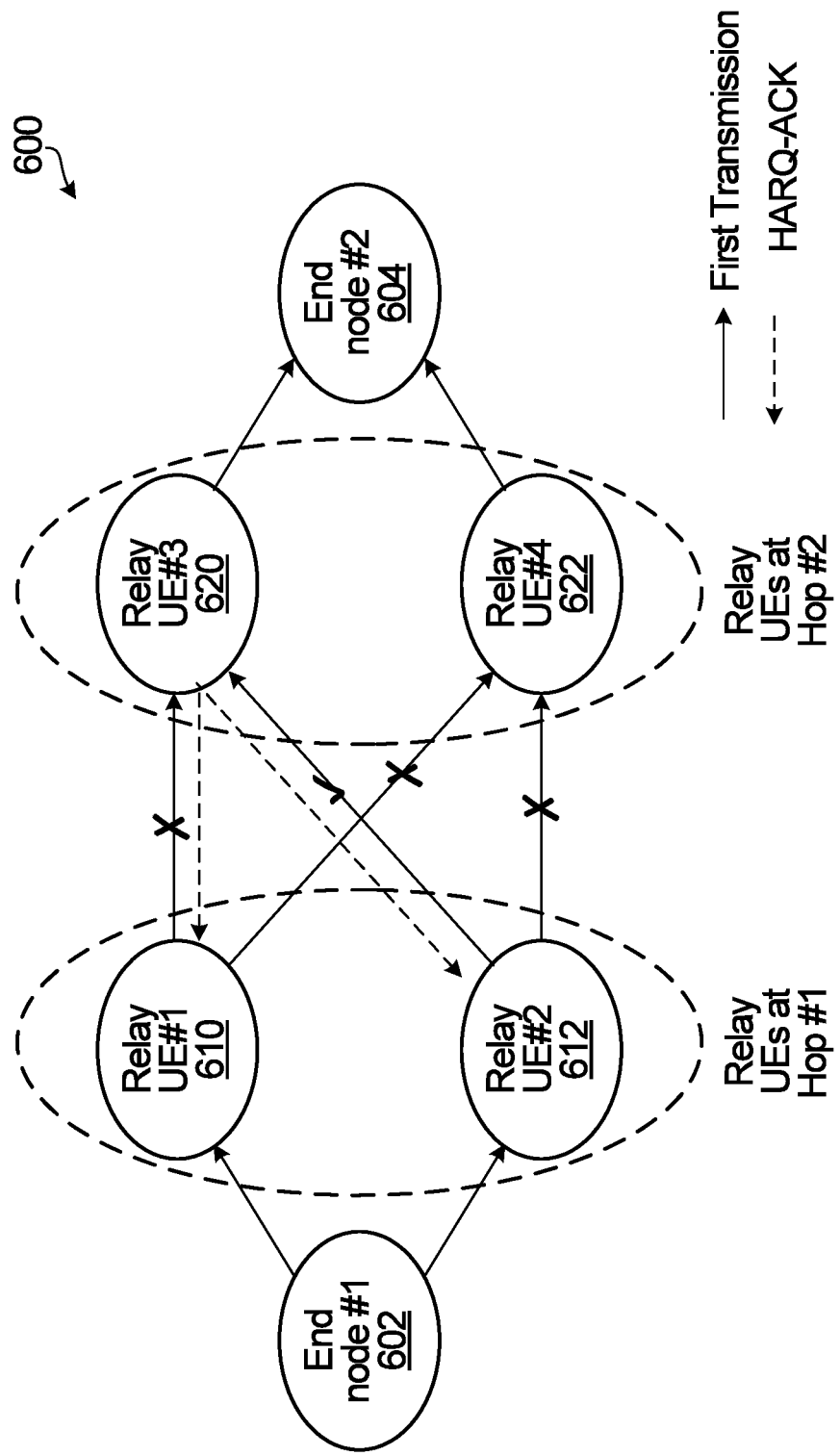
FIG. 13 is a block diagram illustrating an example of hop-by-hop feedback for multi-path, multi-hop communications.

FIG. 13 is a block diagram illustrating an example of hop-by-hop feedback for multi-path, multi-hop communications. FIG. 13 reproduces the example communication system in FIG. 6, and shows HARQ-ACK feedback from relay UE #3 620 to relay UE #2 612 and relay UE #1 610 after hard-combining and successful decoding of data from relay UE #2. Even though only the transmission of the data from relay UE #2 at hop #1 to relay UE #3 at hop #2 was successful, HARQ-ACK feedback may be transmitted by relay UE #3 over all links on which the same data or related data was received.

Hard-combining may be based on an assumption that the same information bits or different RVs of the same information bits are transmitted with different side information, such as different header information. Hard-combining is an example of a feature that may be provided in some embodiments. For example, L2 relay UEs and/or L3 layer UEs may support hard-combining, whereas L1 relay UEs may support forwarding of TBs without higher-layer features such as decoding for hard-combining and thus could support soft-combining.

End-to-end HARQ process feedback may include hop-by-hop feedback and end-to-end feedback in some embodiments.

Regarding hop-by-hop feedback, for each link between relay UE(s) at different hops or between relay UE(s) at a last hop and an end node, if a receiving node (relay UE or end node) receives and decodes data successfully, then a hop-by-hop HARQ-ACK could be sent to the previous relay UE(s) or end node. A previous relay UE or end node might not flush an end-to-end HARQ buffer for the time being, because in this example the HARQ-ACK is hop-by-hop feedback and therefore may not guarantee an end-to-end success of a data transmission.

Otherwise, if a receiving node does not successfully decode received data, then a hop-by-hop HARQ-NACK could be sent to the previous relay UE(s) or end node, which could then re-transmit the same data, the same RV version of the data that was previously transmitted, or a different RV version of the data. HARQ-NACK need not necessarily be transmitted. Lack of a HARQ-ACK within a certain time after transmission may be interpreted by a transmitting node as HARQ-NACK, for example.

Figure 14:
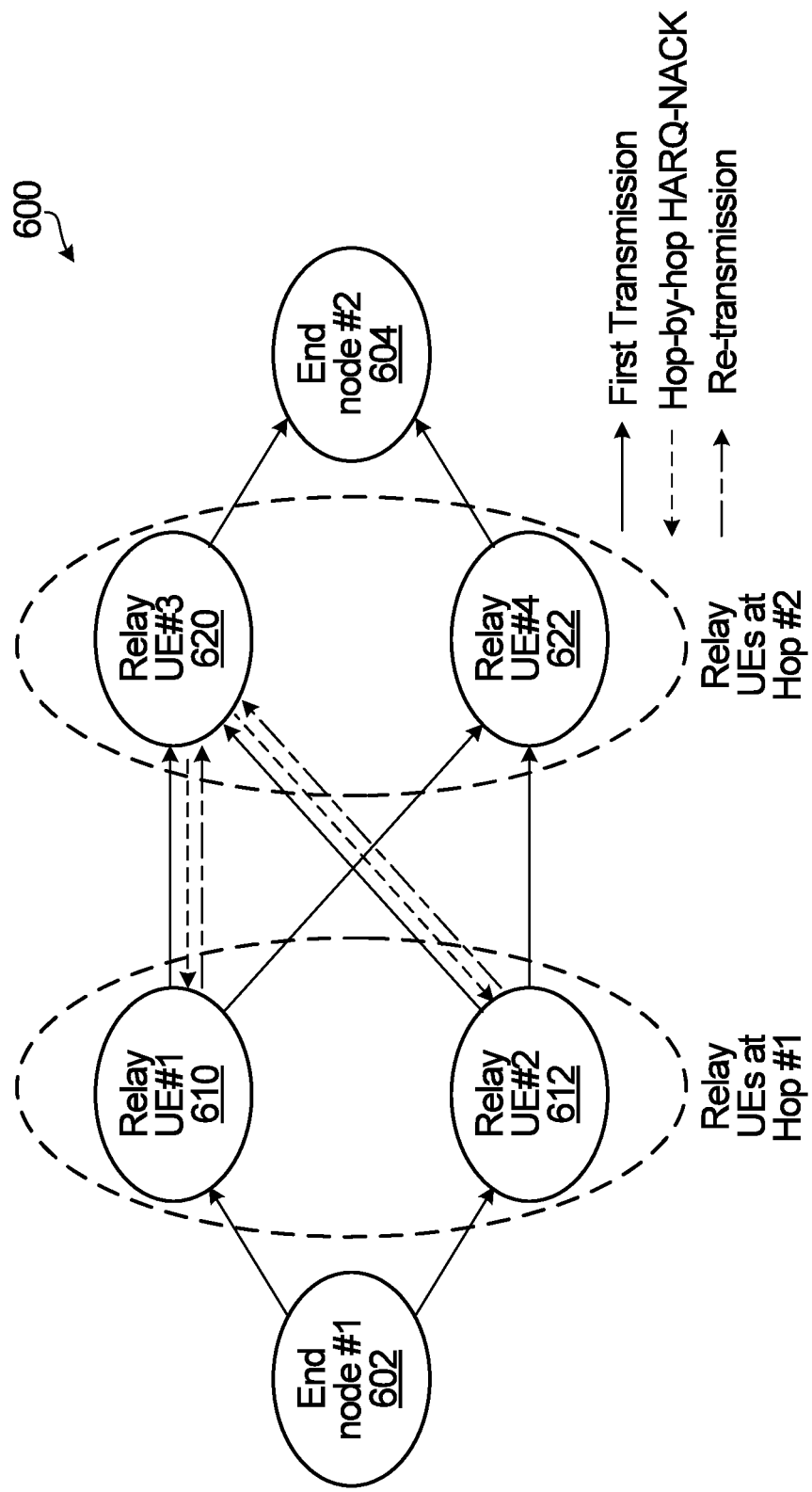
FIG. 14 is a block diagram illustrating another example of hop-by-hop feedback for multi-path, multi-hop communications.

FIG. 14 is a block diagram illustrating another example of hop-by-hop feedback for multi-path, multi-hop communications. FIG. 14 reproduces the example communication system in FIG. 6, and shows a hop-by-hop HARQ-NACK feedback from relay UE #3 620 to relay UE #2 612 and relay UE #1 610 after failure to successfully decode received data. Any or all of the transmitting nodes, in this example relay UE #2 612 and relay UE #1 610, may re-transmit the data or its RVs thereof again to relay UE #3 620 after receiving the hop-by-hop HARQ-NACK.

Hop-by-hop feedback may optionally be provided in some embodiments, in addition to end-to-end HARQ feedback.

Turning to end-to-end feedback, if the destination node receives and decodes data successfully, then an end-to-end HARQ-ACK for the end-to-end HARQ process could be sent to the source node, and may also be received by one or more intermediate nodes such as relay UE(s) between the destination node and the source node as well. The source node, and each relay UE that receives an end-to-end HARQ-ACK, could flush its corresponding end-to-end HARQ buffer for the end-to-end HARQ process and/or otherwise complete the end-to-end HARQ process after receiving the end-to-end HARQ-ACK.

Otherwise, an end-to-end HARQ-NACK for the end-to-end HARQ process could be sent to the source node, possibly via one or more intermediate nodes such as relay UE(s). HARQ-NACK need not necessarily be transmitted. Lack of a HARQ-ACK within a certain time after transmission may be interpreted by a transmitting node as HARQ-NACK, for example. Re-transmission of data could start using the same end-to-end HARQ process. The data or a different RV version of the data may be re-transmitted from the source node, or from any intermediate node such as a relay UE between the source node and the destination node to save on latency, if the data is still maintained in the corresponding HARQ buffer for the end-to-end HARQ process at the intermediate node.

Figure 15:
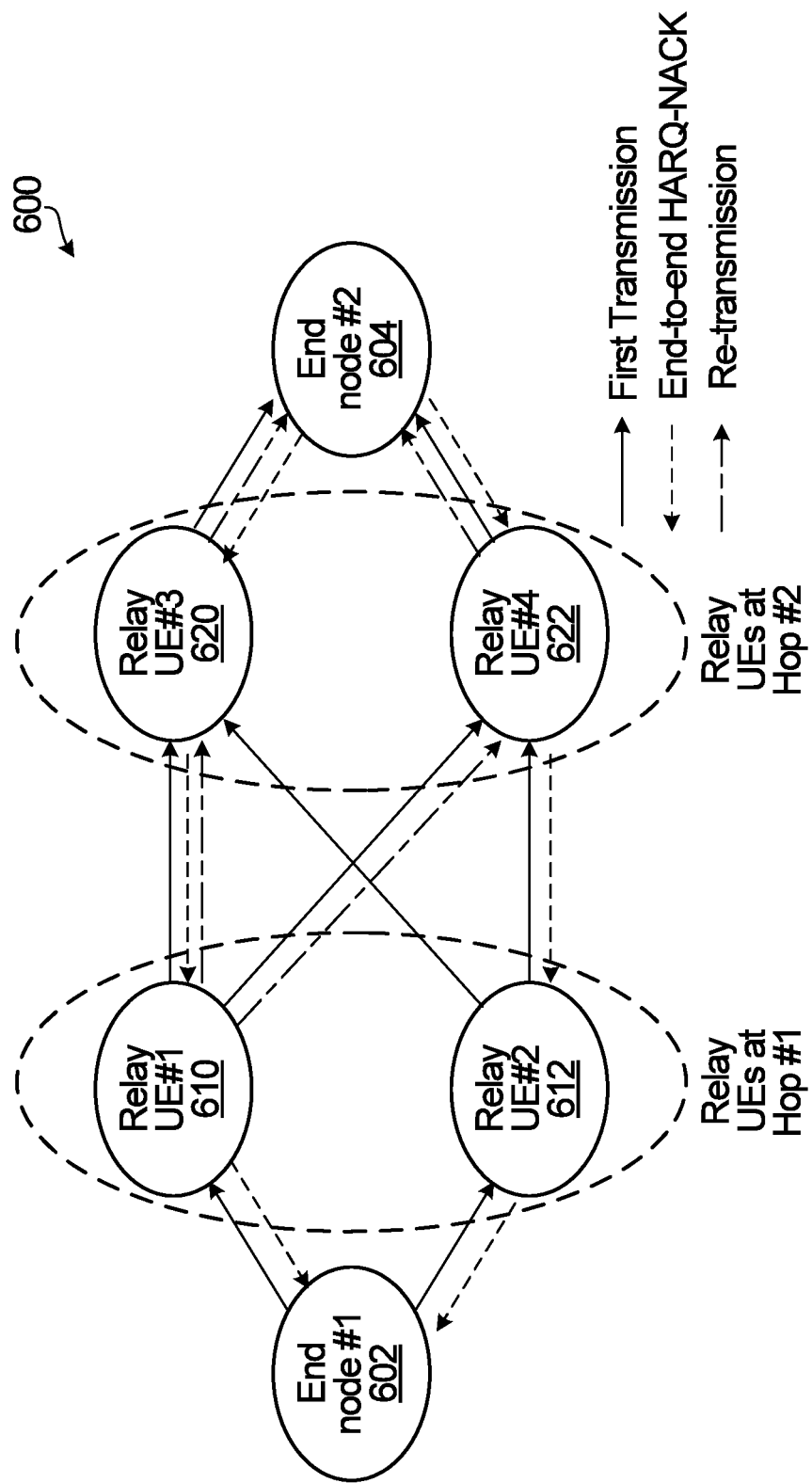
FIG. 15 is a block diagram illustrating an example of end-to-end feedback and re-transmissions for multi-path, multi-hop communications.

FIG. 15 is a block diagram illustrating an example of end-to-end feedback and re-transmissions for multi-path, multi-hop communications. FIG. 15 reproduces the example communication system in FIG. 6, and shows an end-to-end HARQ-NACK feedback sent to end node #1 602, which is the source node in the example shown, from end node #2 604, which is the destination node in the example shown. The end-to-end HARQ-NACK feedback is sent via the relay UEs by the end node #2 604 after failure to successfully decode received data. Any or all of the intermediate nodes may re-transmit the data or RVs thereof to the end node #2 604 after receiving such end-to-end HARQ-NACK. In the example shown, relay UE #1 610 sends a re-transmission, through relay UE #3 620 and relay UE #4 622, if its end-to-end HARQ buffer is not flushed and still maintains the data.

Although hop-by-hop HARQ feedback is optional for an end-to-end HARQ process, end-to-end HARQ feedback enables an end-to-end HARQ process to either complete or proceed with re-transmission(s).

These end-to-end HARQ process procedure examples and examples of intermediate node and destination node decoding behavior and feedback enable an end-to-end HARQ process and potentially improve performance for multi-path and multi-hop relay systems in terms of reliability and latency.

Figure 16:
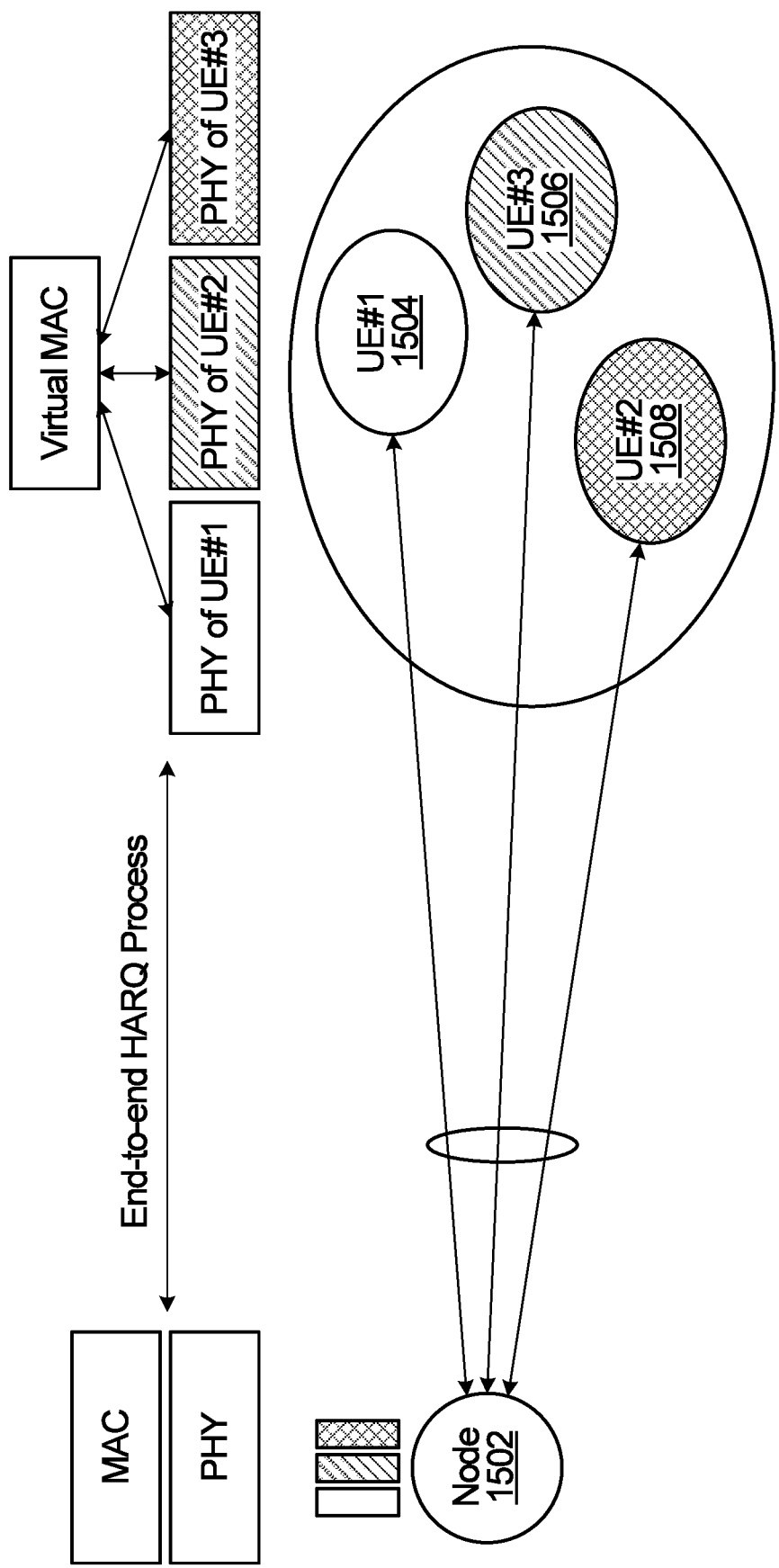
FIG. 16 is a block diagram illustrating an example application of HARQ in conjunction with a virtual UE.

End-to-end HARQ as disclosed herein may be implemented in any of various scenarios or operating environments. FIG. 16, for example, is a block diagram illustrating an example application of HARQ in conjunction with a virtual UE. MAC and PHY layers for a node 1502 and a virtual UE (formed by a group of UEs 1504, 1506, 1508) are shown at the top of FIG. 16. Higher layers and/or other features or functions may also or instead be provided or supported in other embodiments. For example, either or both of the node 1502 and the virtual UE may include a HARQ entity and/or have a HARQ buffer allocated or configured for the end-to-end HARQ process.

An end-to-end HARQ process that is configured between a node such as 1502 and a virtual UE may be referred to as a virtual end-to-end HARQ process. A virtual MAC for the virtual UE could be used to handle the end-to-end HARQ process. The virtual MAC could be implemented on one of the UEs 1504, 1506, 1508 in the virtual UE, such as a master UE, or could be implemented on each UE of the virtual UE with coordination.

The end-to-end HARQ process in FIG. 16 is between the node 1502 and the virtual UE, but this is not intended to imply that there is only a direct link between the node 1502 and the virtual UE or that no other nodes are involved. For example, there may be intermediate nodes (not shown) between the node 1502 and the virtual UE, or another multi-link path (not shown) between the node 1502 and the virtual UE. The illustrated link between the node 1502 and the virtual UE could be one link in a multi-link path between other end nodes (not shown). It should also be noted that an end-to-end HARQ process may be applied between virtual UEs. As one example, if data transmitted by node 1502 is successfully received by any of the UEs 1504, 1506, 1508 in the virtual UE, then a HARQ-ACK will be sent from the virtual UE to the node 1502. Alternatively, each UE 1504, 1506, 1508 in the virtual UE could decode part of the data or work together to decode the data and could send HARQ-ACK if such decoding is successful. In another example, if any or all of the UEs 1504, 1506, 1508 in the virtual UE send data or each UE sends part of the same data, they are considered as part of the same virtual HARQ process and if the node 1502 successfully receives such data (sent from one or more of the UEs in the virtual UE), then the HARQ process will be terminated and can be used for a new data transmission.

Figure 17:
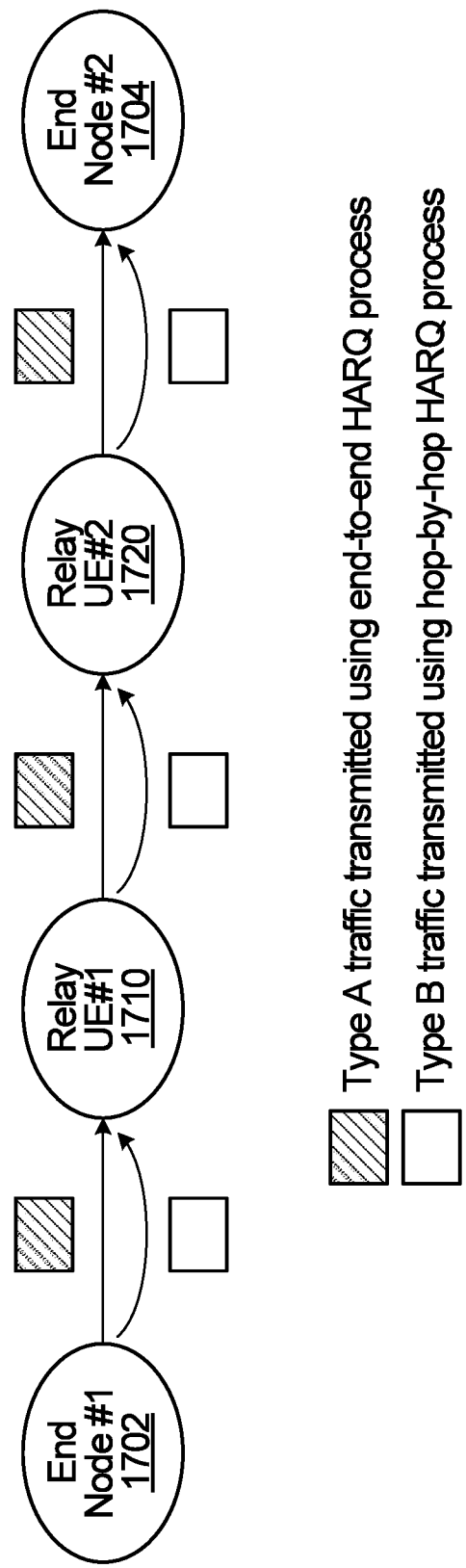
FIG. 17 is a block diagram illustrating different types of HARQ processes for different types of traffic.

For scenarios in which different types of traffic are supported, traffic could be divided into different types and use different types of HARQ processes. FIG. 17 is a block diagram illustrating different types of HARQ processes for different types of traffic. For example, traffic with more stringent latency and/or reliability requirements, shown by way of example as "Type A traffic" in FIG. 17, could use an end-to-end HARQ process between end nodes #1 and #2 1702, 1704, and traffic with less stringent requirements on latency and/or reliability, shown by way of example as "Type B traffic" in FIG. 17, could use hop-by-hop HARQ processes on each link between end node #1 1702 and relay UE #1 1710, between relay UE #1 1710 and UE #2 1720, and between relay UE #2 1720 and end node #2 1704.

Figure 18:
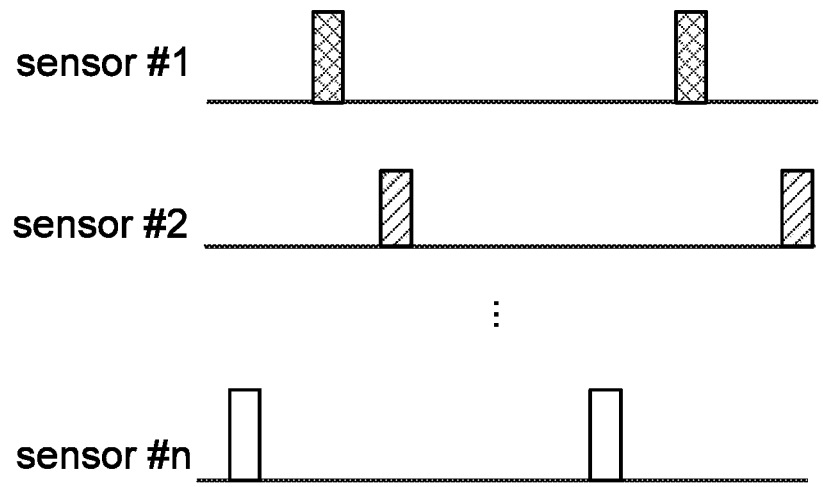
FIG. 18 includes plots illustrating examples of burst and periodic traffic.
Figure 19:
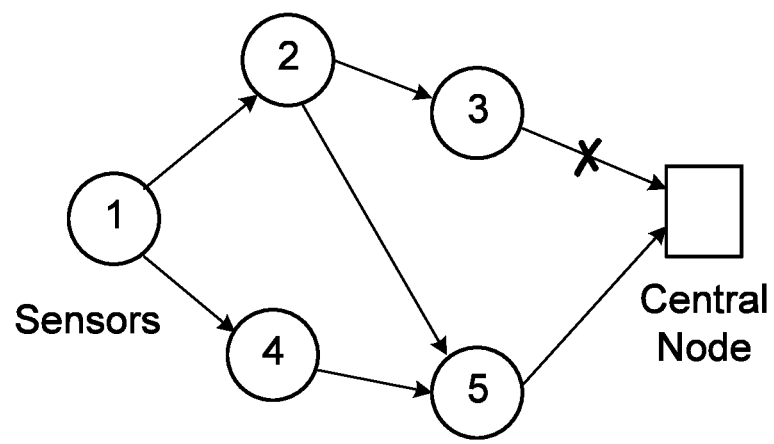
FIG. 19 is a block diagram illustrating an example internet of things (IoT) system.

For IoT or vertical scenarios in which a large number of sensors have data to transmit to a network or central node and the majority traffic is burst traffic with periodicity, multiple sensors could group together to cooperate on data transmission. FIG. 18 includes plots illustrating examples of burst and periodic traffic, and FIG. 19 is a block diagram illustrating an example IoT system. Multiple paths, including relay paths, could be formed between each of the sensors and the central node in FIG. 19, to transmit the sensor traffic shown in FIG. 18.

An end-to-end HARQ process could be configured for transmissions of different data between an end node pair {sensor, central node}. Any remaining HARQ buffers could be configured for hop-by-hop HARQ processes, for less latency-sensitive traffic or non-periodic traffic, for example.

A sensor could use one or more of the relay paths configured between itself and the central node to transmit data. For example, in FIG. 19 sensor 1 has multiple paths connecting it with the central node, including paths through sensor nodes 1-2-3, 1-2-5, and 1-4-5. If one relay path is blocked by obstacles or otherwise not available or experiences dynamic path quality degradation or failure, then another backup path or alternative path could be used.

As an example, in the case of the link from sensor 3 to the central node being blocked by an object, if an end-to-end HARQ process is used then sensor 2 could still have data in its joint HARQ buffer and use an alternative path 2→5→central node to transmit or re-transmit the data.

These end-to-end HARQ process examples illustrate that end-to-end HARQ may be applied to different scenarios, such as virtual UE, multi-hop relay supporting different types of traffic, and/or IoT, to potentially provide flexibility in supporting different types of nodes or traffic and overcome dynamic channel variations. In a more general sense, an end-to-end HARQ process could be applied to other scenarios in which a UE or other node could receive the same data or a related version (RV for example) from different links and the same end-to-end HARQ process is configured and used to carry them over the different links. Here, the different links could be links with the same or different air interfaces, with different component carriers, from different bandwidth parts (BWPs), from different network devices or different UE or other nodes, or some combination thereof. In such scenarios, end-to-end HARQ would allow the receiver to determine that the same data or its related version are carried on the different links but are part of the same HARQ process and apply appropriate receiving techniques to maximize reception performance and send HARQ feedback in a timely manner.

Figure 20:
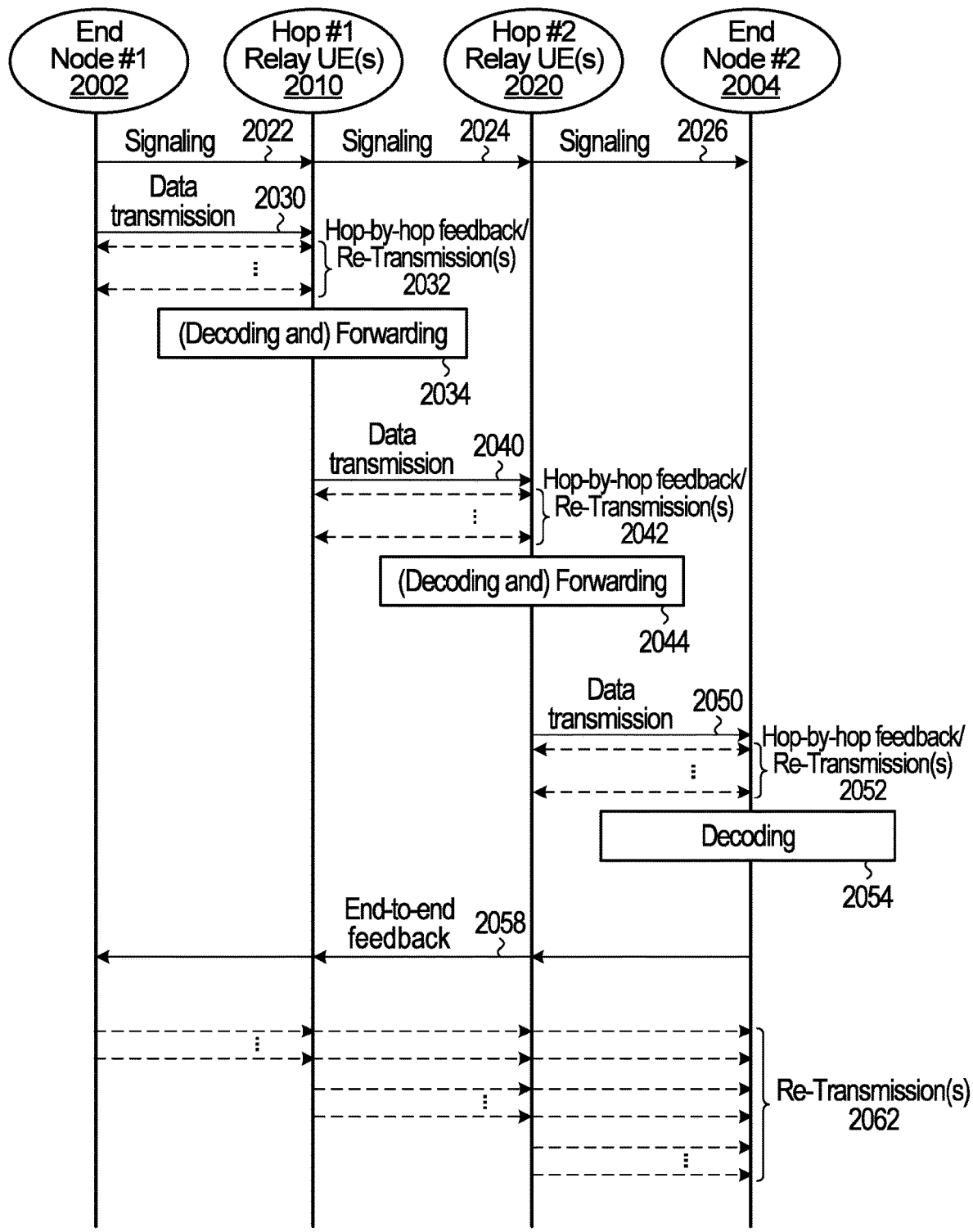
FIG. 20 is a signal flow diagram illustrating operations according to an embodiment.

FIG. 20 is a signal flow diagram illustrating operations according to an embodiment.

FIG. 20 illustrates various features that may be provided in some embodiments. For example, a method may involve communicating, in a wireless communication network, signaling for configuring an end-to-end HARQ process. Such signaling, shown by way of example at 2022, 2024, 2026 in FIG. 20, may be transmitted by a network device and received by each of the nodes, including end node #1 2002, relay UEs 2010, 2020, and end node #2 2004. Another possible option for configuration signaling involves transmitting such signaling by a network device to any one or more of these nodes, which then transmit the signaling to the other node(s). Signaling to configure an end-to-end HARQ process may instead be generated and transmitted by one node, such as end node #1 2002 which is the source end node in the example shown. Alternatively, signaling to configure an end-to-end HARQ process may be generated and transmitted by a master node. The transmitted signaling may be received by each of the other nodes directly or indirectly from the transmitting node.

Communicating signaling may therefore involve either or both of receiving and transmitting such signaling by one or more of nodes, including end nodes and any intermediate in a path between the end nodes. As an example, if the end node #1 2002 generates or receives configuration signaling, then it may transmit that signaling to at least an intermediate node, which in the example shown is at least one relay UE at hop #1. The end node #1 2002 may therefore at least transmit configuration signaling, and may also receive such signaling from a network device (not shown). An intermediate node may receive configuration signaling, from a source node, a network device (not shown), or a previous intermediate node, and transmit the signaling to a next node along a relay path. A destination node such as the end node #2 2004 may at least receive configuration signaling, from a network device (not shown), a source node such as end node #1 2002 in the example shown, or one or more intermediate nodes such as one or more relay UEs 2020 at hop #2 in the example shown.

Signaling to configure an end-to-end HARQ process may be or include higher layer signaling or RRC signaling, for example. Other types of signaling may also or instead be used in other embodiments.

An end-to-end HARQ process, which is configured by the signaling at 2022, 2024, 2026 in the example shown in FIG. 20, is associated with a data transmission from a first end node to a second end node. FIG. 20 illustrates an example of transmitting data from end node #1 2002 to end node #2 2004. Transmission of data is along a UE relay path that includes multiple links between nodes along the relay path. In FIG. 20, a UE relay path includes one or more links between end node #1 2002 and the hop #1 relay UE(s) 2010, one or more links between the hop #1 relay UE(s) and the hop #2 relay UE(s) 2020, and one or more links between the hop #2 relay UE(s) and end node #2 2004.

The end-to-end HARQ process is a single HARQ process that is denoted by a single HARQ process ID, and encompasses or spans the entire UE relay path, which in FIG. 20 is a multi-hop path between end node #1 2002 and end node #2 2004 through one or more relay UEs 2010, 2020 at each of two hops. The HARQ process ID is indicated in the configuration signaling to configure the end-to-end HARQ process, and data may be transmitted as part of the end-to-end HARQ processing with the HARQ process ID. For example, data may be transmitted with DCI or SCI that includes or is otherwise indicative of the HARQ process ID.

Configuring an end-to-end HARQ process may involve allocating a HARQ buffer for the end-to-end HARQ process. In some embodiments, the HARQ buffer for the end-to-end HARQ process is a first buffer in a shared HARQ buffer, as shown by way of example in FIG. 11. A method may then involve communicating further signaling for allocating, in the shared HARQ buffer, a second buffer for a link or hop-by-hop HARQ process associated with a second data transmission between two neighboring or adjacent nodes over a link.

Some embodiments involve allocating a HARQ buffer for the end-to-end HARQ process at each of a first end node, a second end node, and each other node along the entire UE relay path between the first end node and the second end node, a HARQ buffer for the end-to-end HARQ process.

FIG. 20 illustrates an example of end-to-end HARQ associated with transmitting first data between the end nodes 2002, 2004, and in some embodiments a hop-by-hop HARQ process may be configured for transmission of second data between adjacent nodes along the UE relay path. Nodes that are involved in a UE relay path and an end-to-end HARQ process may also be involved in a hop-by-hop HARQ process associated with transmission of different data.

HARQ entities to manage an end-to-end HARQ process may exist only at the end nodes in some embodiments, in which case the end-to-end HARQ process is associated with only two HARQ entities, including a first HARQ entity at a first (source) end node and a second HARQ entity at a second (destination) end node. In such embodiments, only end-to-end HARQ feedback is provided, from the destination end node to the source end node.

With reference to FIG. 20, transmission of data from end node #1 2002 to end node #2 2004 along a UE relay path involves transmission of data at 2030 from end node #1 to one or more hop #1 relay UEs 2010, transmission of the data (or related data that has different header information for example) at 2040 from the one or more hop #1 relay UEs to one or more hop #2 relay UEs 2020, and transmission of the data (or related data that has different header information for example) at 2050 from the one or more hop #2 relay UEs to end node #2 2004. End node 2004 performs decoding at 2054, and generates and transmits end-to-end feedback for the end-to-end HARQ process at 2058. The end-to-end feedback is forwarded back along the same UE relay path as the data in this example, but this is not necessarily the case in all embodiments. Optional re-transmissions, responsive to HARQ NACK feedback at 2058, are shown at 2062.

An end-to-end HARQ process may involve transmitting the data or different versions of the data.

With a HARQ entity only at each end node, intermediate nodes need not necessarily fully decode received data, and may forward the data toward its destination without decoding to determine whether data has been correctly received, for example. Decoding is therefore shown in parentheses at 2034, 2044 in FIG. 20, to indicate that decoding of data is optional. Also, although the re-transmissions at 2062 include re-transmissions from the source node (end node #1 2002 in this example) and the intermediate nodes (relay UEs at 2010, 2020 in this example), in some embodiments only end-to-end HARQ feedback is provided and only the source node re-transmits data or related data after receiving HARQ NACK feedback.

FIG. 20 encompasses embodiments in which link HARQ feedback, also referred to herein and shown in FIG. 20 as hop-by-hop feedback, is provided. For example, a method may involve, at one or more of the destination end node (end node #2 2004 in this example) and an intermediate node (one or more relay UEs at 2010, 2020 in this example) between the end nodes along the UE relay path, generating and transmitting link or hop-by-hop HARQ feedback for the end-to-end HARQ process. In FIG. 20, hop-by-hop feedback and one or more possible per-hop or per-link re-transmissions are show for each link, at 2032, 2042, 2052. Although these feedback and re-transmission options are between nodes along a UE relay path, they are still part of the same end-to-end HARQ process rather than separate hop-by-hop HARQ processes. Hop-by-hop feedback and re-transmissions may be configured in an end-to-end HARQ process for any or all links between end nodes.

Generating hop-by-hop feedback may involve, for example, decoding received data to determine whether reception was successful. Such decoding is shown as optional at 2034, 2044 in order to avoid further congestion in FIG. 20, but may actually be performed before hop-by-hop feedback is transmitted at 2032 or 2042. Similarly, although decoding by the destination end node is shown at 2054 such decoding may be performed before hop-by-hop feedback is transmitted at 2052.

As described above, in some embodiments only end-to-end HARQ feedback is provided and only the source node re-transmits data or related data after receiving HARQ NACK feedback. In other embodiments, an intermediate node (one or more relay UEs at 2010, 2020 in the example shown in FIG. 20) may store the data, after decoding the data from received data transmission for example, in a HARQ buffer at the intermediate node. The data may be relayed toward the destination end node and, responsive to end-to-end HARQ feedback from the destination end node at 2058 indicating negative acknowledgement of the data, the data is re-transmitted from the HARQ buffer toward the second end node. The re-transmitting may involve re-transmitting exactly the same data or related data such as a different RV. An end-to-end HARQ process may also or instead involve, at an intermediate node, flushing the data from the HARQ buffer responsive to the end-to-end HARQ feedback at 2058 indicating acknowledgement of the data.

The UE relay path shown in FIG. 20, and some other examples herein, are illustrative of a multi-hop UE relay path that includes multiple intermediate nodes (at hop #1 and hop #2 in FIG. 20) between a first end node and the second end node along the relay path.

Multi-path embodiments are also possible, for example if there are multiple relay UEs at one or both of the hops in FIG. 20 or an additional UE relay path or direct path between the end nodes 2002, 2004. In a multi-path embodiment, a UE relay path is one of multiple paths between a first end node and a second end node, and the end-to-end HARQ process is associated with transmitting the data from the first end node to the second end node to transmit the first data over the multiple paths.

A method in a multi-path scenario may involve, at the second end node or an intermediate node between the first end node and the second end node, combining data received as part of the end-to-end HARQ process and received over different paths of the multiple paths. The received data may include data from an original transmission and/or a re-transmission as part of the end-to-end HARQ process. The combining may be or include soft combining or hard combining.

Possible applications of end-to-end HARQ as disclosed herein include, for example: virtual UE embodiments, wherein one or more of a first end node, a second end node, and a node of a UE relay path includes a virtual UE; embodiments in which different types of traffic may be handled differently, wherein the data for which transmissions are handled as part of the end-to-end HARQ process has more stringent requirements for one or both of latency and reliability than other data that is not transmitted or re-transmitted in, or otherwise not associated with, the end-to-end HARQ process; and IoT embodiments, wherein one or more of a first end node, a second end node, and a node of a UE relay path includes an IoT sensor. These are illustrative and non-limiting examples disclosed herein, and other embodiments are possible.

Many of the foregoing embodiments relate to example methods. Embodiments may also or instead be embodied in other forms, including apparatus and non-transitory computer readable storage media, for example.

A non-transitory computer readable storage medium, for example, may store programming for execution by a processor. Such a storage medium may comprise a computer program product, or be implemented in an apparatus that also includes at least one processor coupled to the storage medium.

Processors 210, 260, 276 and storage media in the form of memory 208, 258, 278 are shown by way of example in FIG. 3. Thus, apparatus embodiments may include an ED as shown by way of example at 110 in FIG. 3, and a network device such as a T-TRP as shown by way of example at 170 in FIG. 3 and/or an NT-TRP as shown by way of example at 172 in FIG. 3. In some embodiments, an apparatus may include other components, such as a communication interface to which a processor is coupled. A communication interface may include elements such as those shown at 201/203/204, 252/254/256, and/or 272/274/280 in FIG. 3. These are illustrative examples of apparatus, and other apparatus embodiments are possible.

In an embodiment, programming stored in a computer-readable storage medium, whether implemented as a computer program product or in an apparatus, may include instructions to, or to cause the processor or apparatus to: communicate, in a wireless communication network, signaling for configuring an end-to-end HARQ process associated with a first data transmission from a first end node to a second end node along a UE relay path that include multiple links between nodes along the relay path between the first end node and the second end node. The end-to-end HARQ process is a single HARQ process that is denoted by a single HARQ process identifier.

Features disclosed elsewhere herein may be implemented in such apparatus and/or computer program product embodiments. These features include, for example, any of the following, alone or in any of various combinations:

the configuring involves allocating a first buffer for the end-to-end HARQ process;

the allocating involves allocating the first buffer in a shared HARQ buffer, and the programming further includes instructions to: communicate further signaling for allocating, in the shared HARQ buffer, a second buffer for a link HARQ process associated with a second data transmission between two of the nodes over one of the links;

the end-to-end HARQ process is associated with only two HARQ entities, including a first HARQ entity at the first end node and a second HARQ entity at the second end node;

the programming further includes instructions to, at the second end node: transmit end-to-end HARQ feedback for the end-to-end HARQ process;

the programming further includes instructions to, at one or more of the second end node and an intermediate node between the first end node and the second end node along the UE relay path: transmit link HARQ feedback for the end-to-end HARQ process;

the end-to-end HARQ process may involve, at an intermediate node between the first end node and the second end node along the UE relay path: storing the first data in a HARQ buffer at the intermediate node; relaying the first data toward the second end node; and responsive to the end-to-end HARQ feedback from the second end node indicating negative acknowledgement of the first data, re-transmitting the first data from the HARQ buffer toward the second end node;

the programming further includes instructions to, at an intermediate node between the first end node and the second end node along the UE relay path: store the first data in a HARQ buffer at the intermediate node; relay the first data toward the second end node; and, responsive to the end-to-end HARQ feedback from the second end node indicating negative acknowledgement of the first data, re-transmit the first data from the HARQ buffer toward the second end node;

the end-to-end HARQ process may involve, at an intermediate node between the first end node and the second end node along the UE relay path: storing the first data in a HARQ buffer at the intermediate node; relaying the first data toward the second end node; and responsive to the end-to-end HARQ feedback from the second end node indicating acknowledgement of the first data, flushing the first data from the HARQ buffer;

the programming further includes instructions to, at an intermediate node between the first end node and the second end node along the UE relay path: store the first data in a HARQ buffer at the intermediate node; relay the first data toward the second end node; and, responsive to the end-to-end HARQ feedback from the second end node indicating acknowledgement of the first data, flush the first data from the HARQ buffer;

the UE relay path includes a multi-hop UE relay path with multiple intermediate nodes between the first end node and the second end node along the relay path;

the UE relay path is one of multiple paths between the first end node and the second end node, and the end-to-end HARQ process is associated with transmitting the first data from the first end node to the second end node over the multiple paths;

the programming further includes instructions to, at the second end node or an intermediate node between the first end node and the second end node: combine data received as part of the end-to-end HARQ process and received over different paths of the multiple paths;

the instructions to combine include instructions to combine the data by soft combining or hard combining;

one or more of: the first end node, the second end node, and a node of the UE relay path is or includes a virtual UE;

the first data has more stringent requirements for one or both of latency and reliability than other data that is not associated with the end-to-end HARQ process;

one or more of: the first end node, the second end node, and a node of the UE relay path is or includes an IoT sensor;

the programming further includes instructions to: transmit the first data with downlink control information or sidelink control information that includes or otherwise indicates the HARQ process identifier;

the signaling is or includes higher layer signaling;

the end-to-end HARQ process involves transmitting the first data or different versions of the first data;

the programming further includes instructions to: allocate, at each of the first end node, the second end node, and each other node along the entire UE relay path between the first end node and the second end node, a HARQ buffer for the end-to-end HARQ process.

Figure 21:
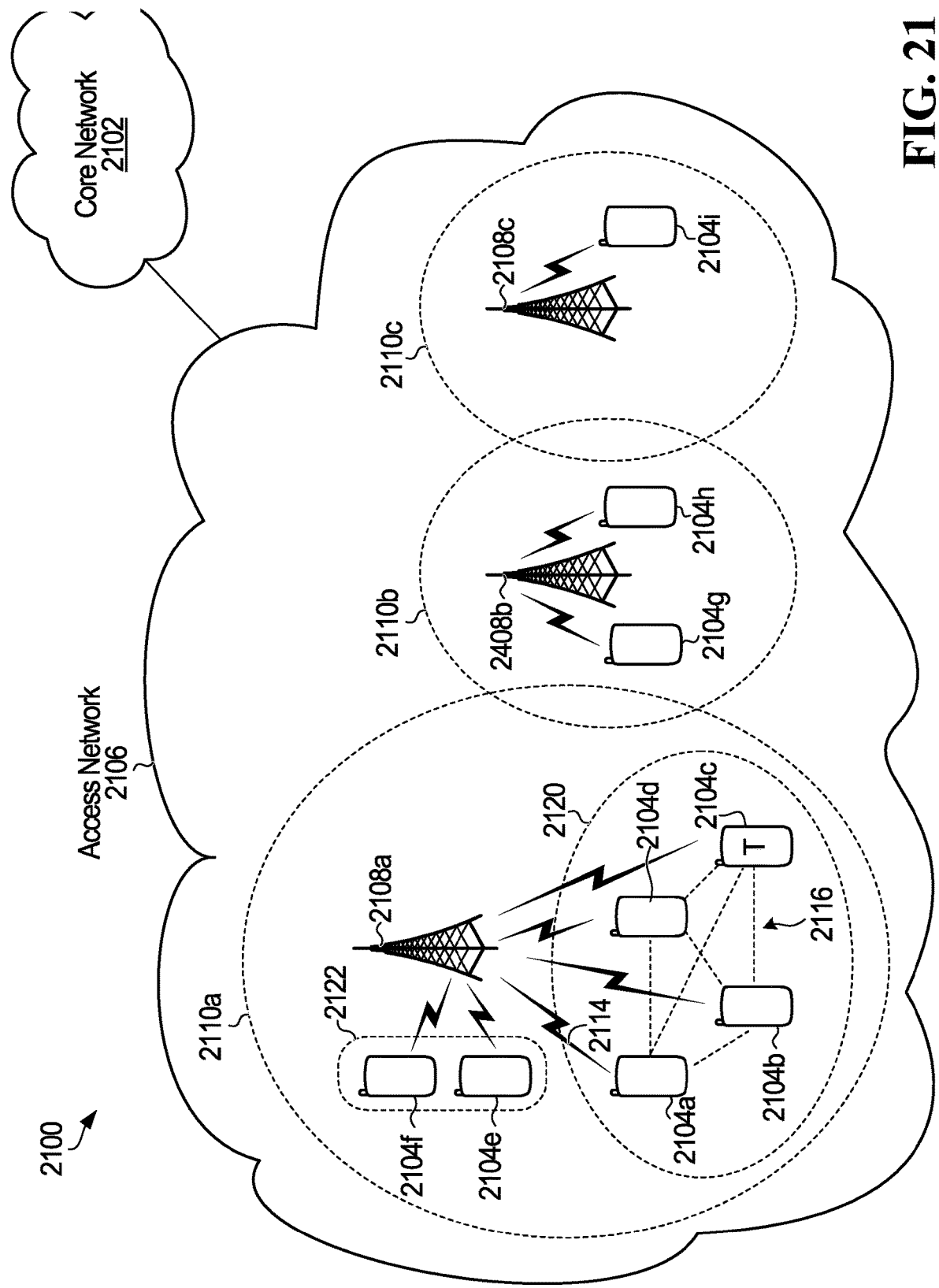
FIG. 21 is a block diagram illustrating an example of a telecommunications network according to one embodiment.

Other apparatus or system features may be implemented in some embodiments. FIG. 21 is a block diagram illustrating an example of a telecommunications network 2100 according to one embodiment. The telecommunications network 2100 includes a core network 2102 and an access network 2106. The access network 2106 serves a plurality of UEs 2104a, 2104b, 2104c, 2104d, 2104e, 2104f, 2104g, 2104h, and 2104i. The access network 2106 is an Evolved Universal Terrestrial Access (E-UTRA) network in some embodiments. Another example of an access network 2106 is a cloud access network (C-RAN). The access network 2106 includes a plurality of BSs 2108a, 2108b, and 2108c. The BSs 2108a-c each provide a respective wireless coverage area 2110a, 2110b, and 2110c, also referred to as a cell. Each of the BSs 2108a-c could be implemented using a radio transceiver, one or more antennas, and associated processing circuitry, such as antenna radio frequency (RF) circuitry, one or more analog-to-digital converters, one or more digital-to-analog converters, etc.

Although not illustrated, the BSs 2108a-c are each connected to the core network 2102, either directly or through one or more central processing hubs, such as servers. The BSs 2108a-c could serve as a gateway between the wireline and wireless portion of the access network 2106.

Each one of BSs 2108a-c may instead be referred to as a base transceiver station, a radio BS, a network node, a transmit node, a transmit point, a Node B, an eNode B, a remote radio head (RRH), or otherwise, depending upon the implementation.

In operation, the plurality of UEs 2104a-i access the telecommunications network 2100 using the access network 2106 by wirelessly communicating with one or more of the BSs 2108a-c.

UEs 2104a-d are in close proximity to each other. Although the UEs 2104a-d can each wirelessly communicate with the BS 2108a, they can also directly communicate with each other, as represented at 2116. The communications represented at 2116 are direct communications between UEs, such as sidelink communications as disclosed herein, that do not go through an access network component, such as a BS. As shown in FIG. 21, UE to UE communications 2116 are directly between the UEs 2104a-d and are not routed through the BS 2108a, or any other part of the access network 2106. Communications 2116 may also be referred to as lateral communications. In embodiments disclosed herein, UE to UE communications use a sidelink channel and a sidelink air interface. On the other hand, a communication between an access network component, such as BS 2108a, and a UE, as in communication 2114, is called an access communication. An access communication occurs over an access channel, which can be a uplink or downlink channel, and an access communication uses a radio access communication interface, such as a cellular radio access air interface. Access and sidelink air interfaces may use different transmission formats, such as different waveforms, different multiple access schemes, or different radio access technologies. Some examples of radio access technologies that could be used by an access air interface or a sidelink air interface are: Long Term Evolution (LTE), LTE License Assisted Access (LTE-LAA), and WiFi.

By using the sidelink communications 2116, the UEs 2104a-d may be able to assist with wireless communications between the UEs 2104a-d and the BS 2108a. As one example, if UE 2104c fails to correctly decode a packet received from the BS 2108a but UE 2104d is able to receive and correctly decode the packet from the BS 2108a, then UE 2104d could directly transmit the decoded packet to UE 2104c using sidelink communications 2116. As another example, if UE 2104c moves out of wireless coverage area 2118c, such that UE 2104c can no longer wirelessly communicate with the BS 2108a, then UE 2104b could forward messages between the UE 2104c and the BS 2108a. As another example, UE 2104a and UE 2104c could both receive a signal transmitted from the BS 2108a that carries a packet meant for UE 2104c. UE 2104a may then transmit to UE 2104c, via sidelink communications 2116, the signal as received by UE 2104a. UE 2104c may then use the information received from UE 2104a to help decode the packet from the BS 2108a. In these examples, capacity or coverage may be improved by forming an enhanced UE to assist one or more of the UEs 2104a, 2104b, and 2104d.

The UEs 2104a-d form a UE group 2120 in some embodiments. It should be noted, however, that features as disclosed herein are not dependent upon UE groups being explicitly formed in advance.

In UE group 2120 and a scenario in which the UE 2104c is to be assisted, the other UEs 2104a, 2104b, and 2104d form a cooperation candidate set for assisting the UE 2104c. If UEs 2104a and 2104b assist the UE 2104c, then the UEs 2104a and 2104b form the cooperation active set. As UEs 2104a-d move around, some may leave the UE group 2120. UE movement may also or instead result in other UEs joining the UE group 2120. Therefore, the cooperation candidate set may change over time. For example, the cooperation candidate set may change semi-statically. The UE group 2120 may also be terminated by the network 2106, for example, if the network determines that there is no longer a need or opportunity for the UE group 2120 to provide assistance in wireless communication between the BS 2108a and members of the UE group 2120.

There may be more than one UE group. For example, UEs 2104e and 2104f in FIG. 21 form another UE group 2122.

Figure 22:
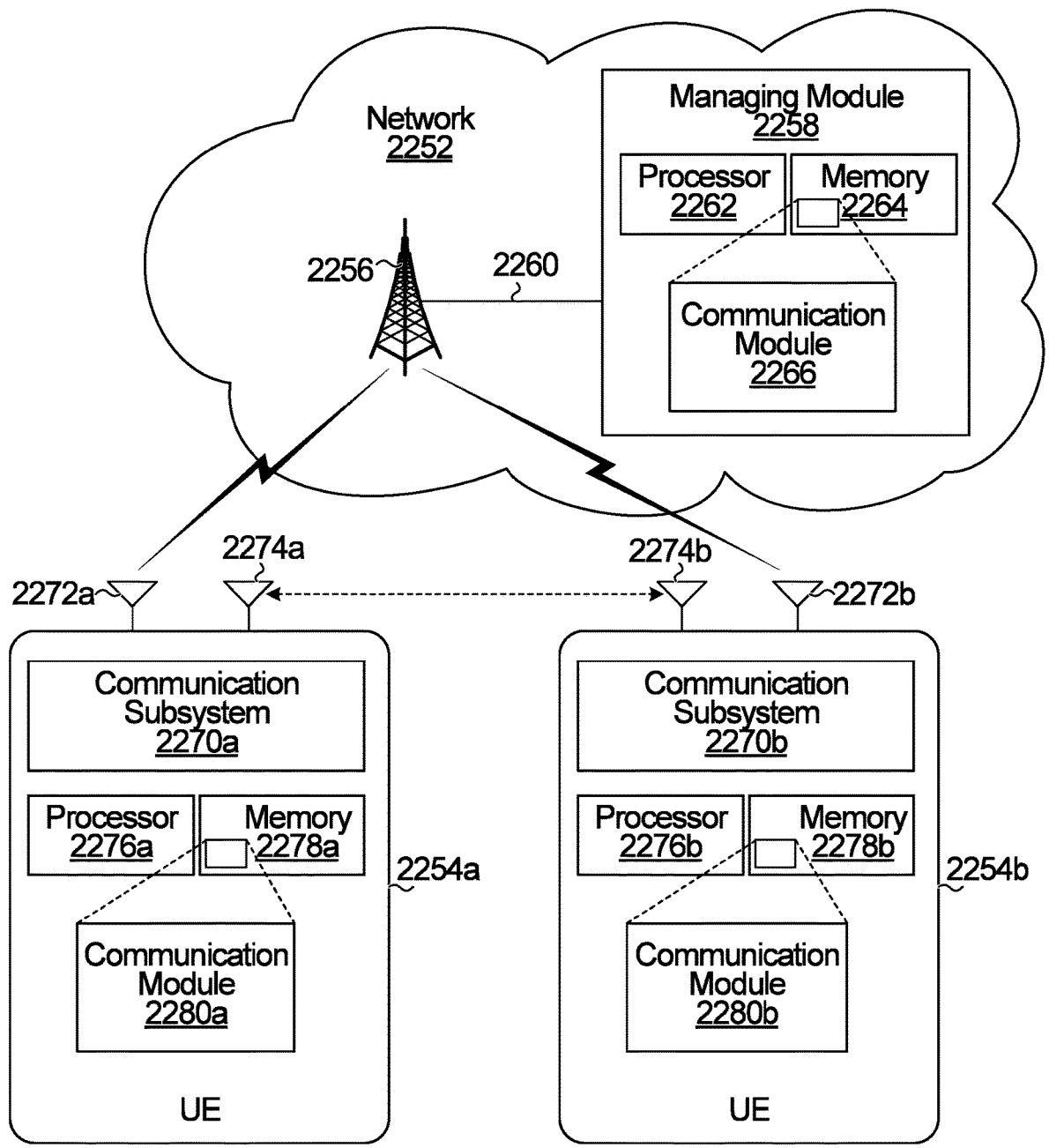
FIG. 22 is a block diagram illustrating an example of a network serving two UEs.

FIG. 22 is a block diagram illustrating an example of a network 2252 serving two UEs 2254a and 2254b, according to one embodiment. The network 2252 may be the access network 2106 from FIG. 21, and the two UEs 2254a and 2254b may be two of the four UEs 2104a-d in FIG. 21, or the UEs 2254a and 2254b may be UEs 2104e and 2104f in FIG. 21. However, more generally this need not be the case, which is why different reference numerals are used in FIG. 22.

The network 2252 includes a BS 2256 and a managing module 2258. The managing module 2258 instructs the BS 2256 to perform actions. The managing module 2258 is illustrated as physically separate from the BS 2256 and coupled to the BS 2256 via a communication link 2260. For example, the managing module 2258 may be part of a server in the network 2252. Alternatively, the managing module 2258 may be part of the BS 2256.

The managing module 2258 includes a processor 2262, a memory 2264, and a communication module 2266. The communication module 2266 is implemented by the processor 2262 when the processor 2262 accesses and executes a series of instructions stored in the memory 2264, the instructions defining the actions of the communication module 2266. When the instructions are executed, the communication module 2266 causes the BS 2256 to perform the actions described herein so that the network 2252 can establish, coordinate, instruct, or control UE cooperation and enhanced UE formation and operation. Alternatively, the communication module 2266 may be implemented using dedicated circuitry, such as an application specific integrated circuit (ASIC) or a programmed field programmable gate array (FPGA).

The UE 2254a includes a communication subsystem 2270a, two antennas 2272a and 2274a, a processor 2276a, and a memory 2278a. The UE 2254a also includes a communication module 2280a. The communication module 2280a is implemented by the processor 2276a when the processor 2276a accesses and executes a series of instructions stored in the memory 2278a, the instructions defining the actions of the communication module 2280a. When the instructions are executed, the communication module 2280a causes the UE 2254a to perform actions described herein in relation to UE cooperation. Alternatively, the module 2280a may be implemented by dedicated circuitry, such as an ASIC or an FPGA.

The communication subsystem 2270a includes processing circuitry, transmit circuitry, and receive circuitry for sending messages from and receiving messages at the UE 2254a. Although one communication subsystem 2270a is illustrated, the communication subsystem 2270a may be multiple communication subsystems. Antenna 2272a transmits wireless communication signals to, and receives wireless communications signals from, the BS 2256. Antenna 2274a transmits sidelink communication signals to, and receives sidelink communication signals from, other UEs, including UE 2254b. In some implementations there may not be two separate antennas 2272a and 2274a. A single antenna may be used. Alternatively, there may be several antennas, but not separated into antennas dedicated only to sidelink communication and antennas dedicated only to communicating with the BS 2256.

SL communications could be over Wi-Fi, in which case the antenna 2274a may be a Wi-Fi antenna. Alternatively, the sidelink communications could be over Bluetooth™, in which case the antenna 2274a may be a Bluetooth™ antenna. Sidelink communications could also or instead be over licensed or unlicensed spectrum.

The UE 2254b includes the same components described above with respect to the UE 2254a. That is, UE 2254b includes communication subsystem 2270b, antennas 2272b and 2274b, processor 2276b, memory 2278b, and communication module 2280b.

FIGS. 21 and 22 illustrate systems in which embodiments could be implemented. In some embodiments, a UE includes a processor, such as 2276a, 2276b in FIG. 22, and a non-transitory computer readable storage medium, such as 2278a, 2278b in FIG. 22, storing programming for execution by the processor. A non-transitory computer readable storage medium could also or instead be provided separately, as a computer program product. Examples are provided elsewhere herein.

The present disclosure encompasses various embodiments related to end-to-end HARQ processes, which may facilitate identification of the same data or related data such as RVs of the same data, in multi-link UE relay with UC, to potentially improve the success opportunity of a transmission from a source to a destination with lower latency.

An end-to-end HARQ process could benefit the transmission of traffic with lower latency requirements such as ultra-reliable low latency communication (URLLC) in a multi-hop relay system for example, and could be useful in IoT scenarios with large amounts of periodic traffic.

Embodiments disclosed herein encompass at least the examples outlined below.

According to an example 1, a method involves communicating, in a wireless communication network, signaling for configuring an end-to-end HARQ process associated with a first data transmission from a first end node to a second end node along a UE relay path that comprises a plurality of links between nodes along the relay path between the first end node and the second end node. The end-to-end HARQ process comprises a single HARQ process that is denoted by a single HARQ process identifier.

An example 2 relates to the method of example 1, wherein the configuring comprises allocating a first buffer for the end-to-end HARQ process.

An example 3 relates to the method of example 2, wherein the allocating comprises allocating the first buffer in a shared HARQ buffer, and the method further involves communicating further signaling for allocating, in the shared HARQ buffer, a second buffer for a link HARQ process associated with a second data transmission between two nodes of the plurality of nodes over a link of the plurality of links.

An example 4 relates to the method of any one of examples 1 to 3, wherein the end-to-end HARQ process is associated with only two HARQ entities, comprising a first HARQ entity at the first end node and a second HARQ entity at the second end node.

An example 5 relates to the method of any one of examples 1 to 4, further comprising, at the second end node: transmitting end-to-end HARQ feedback for the end-to-end HARQ process.

An example 6 relates to the method of example 1, further comprising, at one or more of the second end node and an intermediate node between the first end node and the second end node along the UE relay path: transmitting link HARQ feedback for the end-to-end HARQ process.

An example 7 relates to the method of example 5, wherein the end-to-end HARQ process comprises, at an intermediate node between the first end node and the second end node along the UE relay path: storing the first data in a HARQ buffer at the intermediate node; relaying the first data toward the second end node; responsive to the end-to-end HARQ feedback from the second end node indicating negative acknowledgement of the first data, re-transmitting the first data from the HARQ buffer toward the second end node.

An example 8 relates to the method of example 5, wherein the end-to-end HARQ process comprises, at an intermediate node between the first end node and the second end node along the UE relay path: storing the first data in a HARQ buffer at the intermediate node; relaying the first data toward the second end node; responsive to the end-to-end HARQ feedback from the second end node indicating acknowledgement of the first data, flushing the first data from the HARQ buffer.

An example 9 relates to the method of any one of examples 1 to 8, wherein the UE relay path comprises a multi-hop UE relay path comprising multiple intermediate nodes between the first end node and the second end node along the relay path.

An example 10 relates to the method of any one of examples 1 to 9, wherein the UE relay path comprises one of a plurality of paths between the first end node and the second end node, and the end-to-end HARQ process is associated with transmitting the first data from the first end node to the second end node over the plurality of paths.

An example 11 relates to the method of example 10, further comprising, at the second end node or an intermediate node between the first end node and the second end node: combining data received as part of the end-to-end HARQ process and received over different paths of the plurality of paths.

An example 12 relates to the method of example 11, wherein the combining comprises soft combining or hard combining.

An example 13 relates to the method of any one of examples 1 to 12, wherein one or more of: the first end node, the second end node, and a node in the plurality of nodes of the UE relay path comprises a virtual UE.

An example 14 relates to the method of any one of examples 1 to 13, wherein the first data has more stringent requirements for one or both of latency and reliability than other data that is not associated with the end-to-end HARQ process.

An example 15 relates to the method of any one of examples 1 to 14, wherein one or more of: the first end node, the second end node, and a node in the plurality of nodes of the UE relay path comprises an IoT sensor.

An example 16 relates to the method of any one of examples 1 to 15, further comprising: transmitting the first data with downlink control information or sidelink control information that comprises the HARQ process identifier.

An example 17 relates to the method of any one of examples 1 to 16, wherein the signaling is higher layer signaling.

An example 18 relates to the method of any one of examples 1 to 17, wherein the end-to-end HARQ process comprises transmitting the first data or different versions of the first data.

An example 19 relates to the method of any one of examples 1 to 18, further comprising: allocating, at each of the first end node, the second end node, and each other node along the entire UE relay path between the first end node and the second end node, a HARQ buffer for the end-to-end HARQ process.

According to an example 20, an apparatus comprises: a communication interface; a processor, coupled to the communication interface; and a non-transitory computer readable storage medium, coupled to the processor, storing programming for execution by the processor. The programming comprises instructions to communicate, in a wireless communication network, signaling for configuring an end-to-end HARQ process associated with a first data transmission from a first end node to a second end node along a UE relay path that comprises a plurality of links between nodes along the relay path between the first end node and the second end node. The end-to-end HARQ process comprises a single HARQ process that is denoted by a single HARQ process identifier.

An example 21 relates to the apparatus of example 20, wherein the configuring comprises allocating a first buffer for the end-to-end HARQ process.

An example 22 relates to the apparatus of example 21, wherein the allocating comprises allocating the first buffer in a shared HARQ buffer, and the programming further comprises instructions to: communicate further signaling for allocating, in the shared HARQ buffer, a second buffer for a link HARQ process associated with a second data transmission between two nodes of the plurality of nodes over a link of the plurality of links.

An example 23 relates to the apparatus of any one of examples 20 to 22, wherein the end-to-end HARQ process is associated with only two HARQ entities, comprising a first HARQ entity at the first end node and a second HARQ entity at the second end node.

An example 24 relates to the apparatus of any one of examples 20 to 23, the programming further comprising instructions to, at the second end node: transmit end-to-end HARQ feedback for the end-to-end HARQ process.

An example 25 relates to the apparatus of example 20, the programming further comprising instructions to, at one or more of the second end node and an intermediate node between the first end node and the second end node along the UE relay path: transmit link HARQ feedback for the end-to-end HARQ process.

An example 26 relates to the apparatus of example 24, wherein the end-to-end HARQ process comprises, at an intermediate node between the first end node and the second end node along the UE relay path: storing the first data in a HARQ buffer at the intermediate node; relaying the first data toward the second end node; responsive to the end-to-end HARQ feedback from the second end node indicating negative acknowledgement of the first data, re-transmitting the first data from the HARQ buffer toward the second end node.

An example 27 relates to the apparatus of example 24, wherein the end-to-end HARQ process comprises, at an intermediate node between the first end node and the second end node along the UE relay path: storing the first data in a HARQ buffer at the intermediate node; relaying the first data toward the second end node; responsive to the end-to-end HARQ feedback from the second end node indicating acknowledgement of the first data, flushing the first data from the HARQ buffer.

An example 28 relates to the apparatus of any one of examples 20 to 27, wherein the UE relay path comprises a multi-hop UE relay path comprising multiple intermediate nodes between the first end node and the second end node along the relay path.

An example 29 relates to the apparatus of any one of examples 20 to 28, wherein the UE relay path comprises one of a plurality of paths between the first end node and the second end node, and the end-to-end HARQ process is associated with transmitting the first data from the first end node to the second end node over the plurality of paths.

An example 30 relates to the apparatus of example 29, the programming further comprising instructions to, at the second end node or an intermediate node between the first end node and the second end node: combine data received as part of the end-to-end HARQ process and received over different paths of the plurality of paths.

An example 31 relates to the apparatus of example 30, wherein the instructions to combine comprise instructions to combine the data by soft combining or hard combining.

An example 32 relates to the apparatus of any one of examples 20 to 31, wherein one or more of: the first end node, the second end node, and a node in the plurality of nodes of the UE relay path comprises a virtual UE.

An example 33 relates to the apparatus of any one of examples 20 to 32, wherein the first data has more stringent requirements for one or both of latency and reliability than other data that is not associated with the end-to-end HARQ process.

An example 34 relates to the apparatus of any one of examples 20 to 33, wherein one or more of: the first end node, the second end node, and a node in the plurality of nodes of the UE relay path comprises an IoT sensor.

An example 35 relates to the apparatus of any one of examples 20 to 34, the programming further comprising instructions to: transmit the first data with downlink control information or sidelink control information that comprises the HARQ process identifier.

An example 36 relates to the apparatus of any one of examples 20 to 35, wherein the signaling is higher layer signaling.

An example 37 relates to the apparatus of any one of examples 20 to 36, wherein the end-to-end HARQ process comprises transmitting the first data or different versions of the first data.

An example 38 relates to the apparatus of any one of examples 20 to 37, the programming further comprising instructions to: allocate, at each of the first end node, the second end node, and each other node along the entire UE relay path between the first end node and the second end node, a HARQ buffer for the end-to-end HARQ process.

According to an example 39, a computer program product comprises a non-transitory computer readable storage medium storing programming. The programming comprises instructions to communicate, in a wireless communication network, signaling for configuring an end-to-end HARQ process associated with a first data transmission from a first end node to a second end node along a UE relay path that comprises a plurality of links between nodes along the relay path between the first end node and the second end node. The end-to-end HARQ process comprises a single HARQ process that is denoted by a single HARQ process identifier.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although aspects of the present invention have been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

What is claimed is:

1. A method comprising:
communicating, in a wireless communication network, signaling for configuring an end-to-end hybrid automatic repeat request (HARQ) process associated with a first data transmission from a first end node to a second end node along a user equipment (UE) relay path that comprises a plurality of links between a plurality of nodes along the UE relay path between the first end node and the second end node,
the end-to-end HARQ process comprising a single HARQ process that is denoted by a single HARQ process identifier,
wherein the configuring comprises allocating a first buffer for the end-to-end HARQ process,
wherein the allocating comprises allocating the first buffer in a shared HARQ buffer, the method further comprising:
communicating further signaling for allocating, in the shared HARQ buffer, a second buffer for a link HARQ process associated with a second data transmission between two nodes of the plurality of nodes over a link of the plurality of links.

2. The method of claim 1, wherein the end-to-end HARQ process is associated with only two HARQ entities, comprising a first HARQ entity at the first end node and a second HARQ entity at the second end node.

3. The method of claim 1, further comprising, at the second end node:

transmitting end-to-end HARQ feedback for the end-to-end HARQ process.

4. The method of claim 3, wherein the end-to-end HARQ process comprises, at an intermediate node between the first end node and the second end node along the UE relay path:
storing the first data in a HARQ buffer at the intermediate node;
relaying the first data toward the second end node;
responsive to the end-to-end HARQ feedback from the second end node indicating negative acknowledgement of the first data, re-transmitting the first data from the HARQ buffer toward the second end node.

5. The method of claim 3, wherein the end-to-end HARQ process comprises, at an intermediate node between the first end node and the second end node along the UE relay path:
storing the first data in a HARQ buffer at the intermediate node;
relaying the first data toward the second end node;
responsive to the end-to-end HARQ feedback from the second end node indicating acknowledgement of the first data, flushing the first data from the HARQ buffer.

6. The method of claim 1, further comprising, at one or more of the second end node and an intermediate node between the first end node and the second end node along the UE relay path:
transmitting link HARQ feedback for the end-to-end HARQ process.

7. The method of claim 1, wherein the UE relay path comprises a multi-hop UE relay path comprising multiple intermediate nodes between the first end node and the second end node along the UE relay path.

8. The method of claim 1, wherein the UE relay path comprises one of a plurality of paths between the first end node and the second end node, and the end-to-end HARQ process is associated with transmitting the first data from the first end node to the second end node over the plurality of paths.

9. The method of claim 1, further comprising:
transmitting the first data with downlink control information or sidelink control information that comprises the single HARQ process identifier.

10. The method of claim 1, wherein the end-to-end HARQ process comprises transmitting the first data or different versions of the first data.

11. The method of claim 1, further comprising:
allocating, at each of the first end node, the second end node, and each other node along the UE relay path between the first end node and the second end node, a HARQ buffer for the end-to-end HARQ process.

12. An apparatus comprising:
a communication interface;
a processor, coupled to the communication interface;
a non-transitory computer readable storage medium, coupled to the processor, storing programming for execution by the processor, the programming comprising instructions to:
communicate, in a wireless communication network, signaling for configuring an end-to-end hybrid automatic repeat request (HARQ) process associated with a first data transmission from a first end node to a second end node along a user equipment (UE) relay path that comprises a plurality of links between a plurality of nodes along the UE relay path between the first end node and the second end node,
the end-to-end HARQ process comprising a single HARQ process that is denoted by a single HARQ process identifier,
wherein the configuring comprises allocating a first buffer for the end-to-end HARQ process,
wherein the allocating comprises allocating the first buffer in a shared HARQ buffer, the programming further comprising instructions to:
communicate further signaling for allocating, in the shared HARQ buffer, a second buffer for a link HARQ process associated with a second data transmission between two nodes of the plurality of nodes over a link of the plurality of links.

13. The apparatus of claim 12, wherein the end-to-end HARQ process is associated with only two HARQ entities, comprising a first HARQ entity at the first end node and a second HARQ entity at the second end node.

14. The apparatus of claim 12, the programming further comprising instructions to, at the second end node:
transmit end-to-end HARQ feedback for the end-to-end HARQ process.

15. The apparatus of claim 14, wherein the end-to-end HARQ process comprises, at an intermediate node between the first end node and the second end node along the UE relay path:
storing the first data in a HARQ buffer at the intermediate node;
relaying the first data toward the second end node;
responsive to the end-to-end HARQ feedback from the second end node indicating negative acknowledgement of the first data, re-transmitting the first data from the HARQ buffer toward the second end node.

16. The apparatus of claim 14, wherein the end-to-end HARQ process comprises, at an intermediate node between the first end node and the second end node along the UE relay path:
storing the first data in a HARQ buffer at the intermediate node;
relaying the first data toward the second end node;
responsive to the end-to-end HARQ feedback from the second end node indicating acknowledgement of the first data, flushing the first data from the HARQ buffer.

17. The apparatus of claim 12, the programming further comprising instructions to, at one or more of the second end node and an intermediate node between the first end node and the second end node along the UE relay path:
transmit link HARQ feedback for the end-to-end HARQ process.

18. The apparatus of claim 12, wherein the UE relay path comprises a multi-hop UE relay path comprising multiple intermediate nodes between the first end node and the second end node along the UE relay path.

19. The apparatus of claim 12, wherein the UE relay path comprises one of a plurality of paths between the first end node and the second end node, and the end-to-end HARQ process is associated with transmitting the first data from the first end node to the second end node over the plurality of paths.

20. The apparatus of claim 12, the programming further comprising instructions to:
transmit the first data with downlink control information or sidelink control information that comprises the single HARQ process identifier.

21. The apparatus of claim 12, wherein the end-to-end HARQ process comprises transmitting the first data or different versions of the first data.

22. The apparatus of claim 12, the programming further comprising instructions to:
allocate, at each of the first end node, the second end node, and each other node along the UE relay path between the first end node and the second end node, a HARQ buffer for the end-to-end HARQ process.

23. A computer program product comprising a non-transitory computer readable storage medium storing programming that, when executed by a processor, causes the processor to:
communicate, in a wireless communication network, signaling for configuring an end-to-end hybrid automatic repeat request (HARQ) process associated with a first data transmission from a first end node to a second end node along a user equipment (UE) relay path that comprises a plurality of links between a plurality of nodes along the UE relay path between the first end node and the second end node,
the end-to-end HARQ process comprising a single HARQ process that is denoted by a single HARQ process identifier,
wherein the configuring comprises allocating a first buffer for the end-to-end HARQ process,
wherein the allocating comprises allocating the first buffer in a shared HARQ buffer, the programming, when executed by the processor, further causing the processor to:
communicate further signaling for allocating, in the shared HARQ buffer, a second buffer for a link HARQ process associated with a second data transmission between two nodes of the plurality of nodes over a link of the plurality of links.

* * * * *